United States Patent [19]

Taguchi et al.

[11] 4,170,411
[45] Oct. 9, 1979

[54] CONTROL CIRCUIT FOR A MEMORY TYPE ELECTRIC SHUTTER

[75] Inventors: Tatsuya Taguchi, Tokyo; Yukio Iura, Kawasaki; Yoshiyuki Takishima, Machida, all of Japan; David Fullagar, Los Altos, Calif.

[73] Assignee: Canon Kabushiki Kaisha, Tokyo, Japan

[21] Appl. No.: 751,947

[22] Filed: Dec. 17, 1976

Related U.S. Application Data

[63] Continuation of Ser. No. 548,620, Feb. 10, 1975, abandoned, which is a continuation of Ser. No. 269,465, Jul. 6, 1972, abandoned, which is a continuation of Ser. No. 107,637, Jan. 19, 1971, abandoned.

[30] Foreign Application Priority Data

| Jan. 23, 1970 | [JP] | Japan | 45-6146 |
| Mar. 19, 1970 | [JP] | Japan | 45-23942 |
| May 21, 1970 | [JP] | Japan | 45-43511 |

[51] Int. Cl.$^2$ ............................................. G03B 7/08
[52] U.S. Cl. .................................. 354/24; 354/50; 354/51; 354/60 R
[58] Field of Search ............... 354/24, 50, 51, 60 R, 354/25; 355/68

[56] References Cited

U.S. PATENT DOCUMENTS

| 3,426,357 | 2/1969 | Paulus | 355/68 |
| 3,670,637 | 6/1972 | Mori et al. | 354/24 |
| 3,678,826 | 7/1972 | Mori et al. | 354/25 |
| 3,726,200 | 4/1973 | Ogiso et al. | 354/51 |

*Primary Examiner*—Russell E. Adams
*Attorney, Agent, or Firm*—Toren, McGeady and Stanger

[57] ABSTRACT

In the system disclosed, a feedback circuit connects the output of the last of a plurality of cascaded amplifier stages to the input of the first stage. A photoelectric transducer is connected to one of the stages. The feedback connection compresses the output signal relative to the signal at the photoelectric transducer, logarithmically. Preferably all the stages are linear and the feedback circuit is linear so that no logarithmic members are required. Preferably each of the stages is composed of an amplifier and a connection corresponding to an emitter-follower connection. A suitable system then utilizes the compression characteristic in a shutter control. This system may use a second compression circuit comparable to the first. Additional photographic information may be applied to the input of any of the stages in either compression circuit.

45 Claims, 19 Drawing Figures

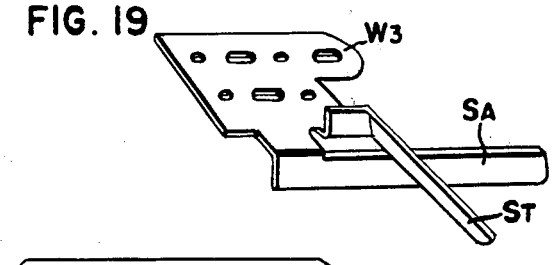
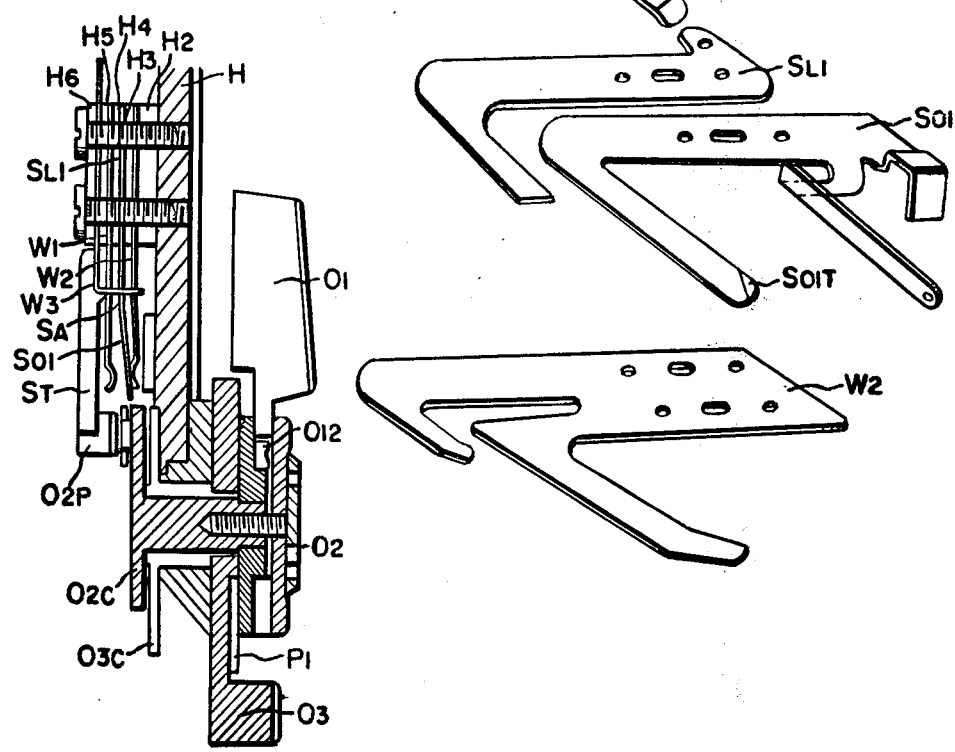

CONTROL CIRCUIT FOR A MEMORY TYPE ELECTRIC SHUTTER

This is a continuation of application Ser. No. 548,620 filed Feb. 10, 1975, which in turn is a continuation of application Ser. No. 269,465 filed July 6, 1972, which in turn is a continuation of application Ser. No. 107,637, filed Jan. 19, 1971, all now abandoned.

The present invention relates to a direct coupled transistor amplifier and a control circuit for an electric shutter having a memory device, particularly to the control circuit of an electric shutter suitable to a through the lens sensing (TTL type) single lens reflex camera, etc. in which the light from an object is received through a photographing lens.

In a TTL type single lens reflex camera, as the photoelectric conversion element for measuring light is arranged for example at an optical path of a finder system, so the incident light entering into the element is interrupted by the up-swing of a mirror, etc., while the shutter is in operation. Therefore, when an optimum exposure value is obtained by controlling the electric shutter circuit by the output of the photo-electric element, it is necessary to memorize the value of light measurement before the shutter is actuated. Electric shutter circuits having such a memory device are proposed in various kinds.

The present invention relates to a direct coupled transistor amplifier comprising an input stage transistor, an output stage transistor, an emitter impedance element for the input stage transistor, a collector resistive element for the output stage transistor, a negative feedback connection between the collector of the output stage transistor and the base of the input stage transistor, the emitter of the input stage transistor being connected directly or indirectly through an intermediate stage transistor with its emitter resistive element to the base of the output stage transistor, in which the emitter impedance element is variable in case of the direct connection and any of the emitter impedance elements of the transistors is variable in case of the indirect connection.

The present invention shall be explained referring to drawings in which:

FIGS. 14 to 19 show a concrete construction of the control mechanism of a camera having the shutter control device according to the present invention.

The present invention further relates to an electric shutter control circuit suitable to such a TTL type single lens reflex camera as mentioned above, particularly to such an electric shutter control circuit that an output due to a photo-electric element is compressed and memorized in a capacitor for electrically setting up various informations necessary for photographing, and as soon as the shutter starts functioning, the memorized value in the capacitor is expanded and regenerated, regenerating the resistance value of the photo-electric element, so as to regenerate a resistance value responsive to that of the photo-electric element just before the start of the shutter actuation, and owing to the delay time of a timer circuit which is determined by the regenerated resistance value and a timer-circuit-constituting capacitor, shutter speed is controlled, especially the electric circuit is so made as easily applicable to an integrated circuit assembly and a compensator circuit for compensating variation in supplied voltage and change in temperature is provided for securing a stable and exact shutter speed.

The present invention is to offer such an electric shutter device suitable to a TTL type single lens reflex camera as mentioned above in which an output from the photoelectric element and such various informations as being necessary for photographing are compressed with respective separate circuits, mixing the outputs therefrom and memorizing the same across a capacitor, and expanding and regenerating the memorized value in said capacitor as soon as the shutter starts functioning, thus the shutter speed is controlled by the above memorized value and by the delay time of the time constant circuit comprising another capacitor, and the present invention is to provide an electric shutter device which is characterized by having special features in the compensating circuit to correspond to the realization of the electric circuits into an integrated circuit assembly, for indicator circuits for checking shutter speed and a battery, and voltage regeneration circuits, and by having special features in the structure of main parts of the shutter actuating mechanism.

Figure 1:
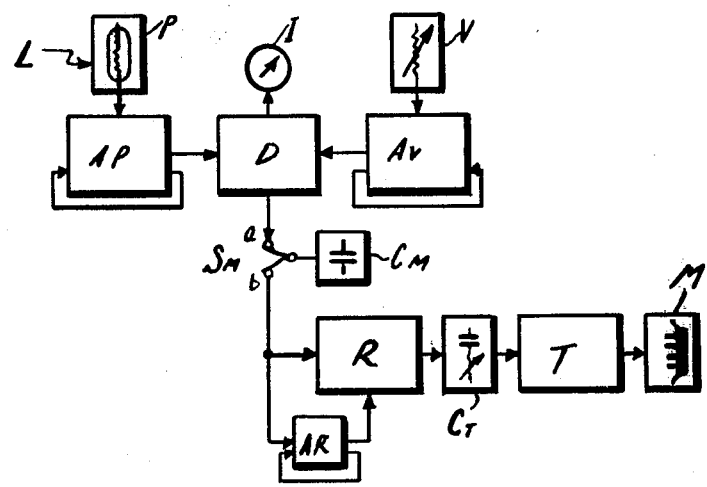
FIG. 1 is a system diagram of a control circuit for a memory type electric shutter according to the present invention.

FIG. 1 is a block diagram of the control circuit of a memory type electric shutter according to the present invention. In the drawing, L is a photo-electric conversion element (for example a photoconductor of CdS) positioned to receive the light from an object through a photographic lens. A transistor amplifying circuit AP contains the photo-electric element L and compresses the change in an output range of a value such as a resistance value of the photo-electric element. A comparison circuit D may for example be in the form of a differential amplifying circuit. A transistor amplifying circuit AV contains a variable element V which enters photographic information such as an aperture value, film sensitivity, etc. into the system. A feedback connection imparts compression characteristics equivalent to the circuit AP to the circuit AV. A meter I such as an ammeter activated by an output current of the combining circuit D indicates the shutter speed. A change-over switch, SM switches a memory capacitor CM from the light measurement circuit to a regeneration circuit R in cooperation with the camera release operation. A transistor amplifying circuit Ar has a feed-back connection.

The reference voltage circuit AR controls the regeneration circuit R with the output effecting expansion of the compressively memorized voltage. A timer circuit CT includes an output resistor element of the regenerator circuit R and a timer capacitor. A transistor switching circuit activates an electro-magnet M to effect a shutter closure.

By the above-mentioned set up the resistance value of the photo-electric element P changes logarithmically over an extensive range. The gain of the transistor amplifying circuit AP without its feed-back connection is varies over an extensive range by this change in the resistance value. The dynamic operative range of the circuit is limited within a certain narrow range but in the present invention as the amplifying circuit AP having a feed-back connection is provided, so this change in gain is logarithmically compressed. Also the gain of the amplifying circuit AV is set to a value corresponding to a preset diaphragm value, film sensitivity, etc. entered by the variable element V, but the range of variation of the gain is compressed by using a feed-back connection in this circuit also in a similar way as in the circuit AP. The compression characteristics of the circuits AP and AV may be adjusted and the difference between the gamma ($\gamma$) of the photo-sensitive element D and the gamma ($\gamma$) of the variable element AP may be compensated. The outputs of the circuits AP and AV are applied to the respective input to terminals of the differential amplifying circuit D as a mixer and an electric voltage determined by the resistance value of the light receiving element and photographic information is generated at the output of the combining circuit D and this output is memorized in the memory capacitor CM. An electric voltage corresponding to the amount of light received of photoelectric element before the shutter control circuit is controlled and activated is memorized in the memory capacitor Cm when the change-over switch SM is connected to the side "a".

Next, when the switch SM is connected to the terminal "b" by the camera release operation, the electric voltage memorized is applied to the input to the regeneration circuit R and that to the reference circuit AR. As the reference circuit AR is a transistor circuit having a feed-back connection similar to the circuits AP and AV, and the bias of the transistor amplifying circuit R is controlled by the compression characteristics of the reference circuit AR. This produces an expansion, so the regenerator circuit R functions as an expansion circuit to regenerate an expanded output current responsive to the memorized voltage which is compressed through the light measurement. In this way the circuit as shown in FIG. 1 works as a compander. The shutter speed control circuit T is actuated with a time constant determined by the resistance value of the regenerator output and the timer capacitor, and thus the electro-magnet M is deenergized to start shutter closure by the switching function of the shutter speed control circuit T.

Figure 2:
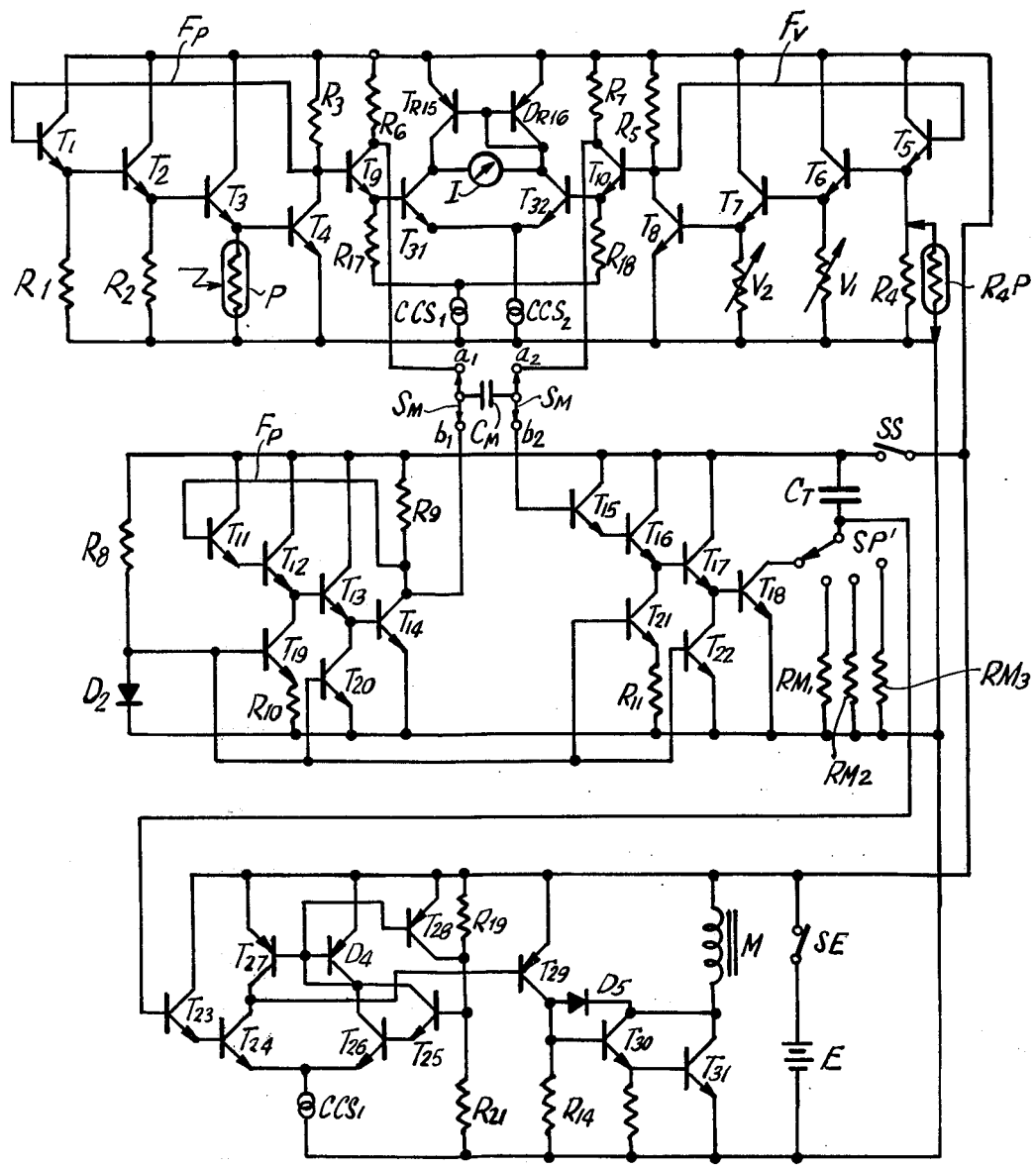
FIG. 2 is a circuit connecting diagram showing the first embodiment of the control circuit according to the present invention.

Next, FIG. 2 is a circuit connection diagram showing an example of a control circuit of the memory type electric shutter according to the present invention. In the drawing, P is a photo-electric conversion element which receives light from an object through a photographing lens. Transistors $T_1$, $T_2$, $T_3$ and $T_4$ form a direct coupled amplifying circuit, and transistors $T_9$ and $T_{10}$ constitute the input stages of differential amplifying circuit, and excite transistors $T_{31}$ and $T_{32}$ constituting output stages. A stabilizing circuit, comprising constant-current circuits $CCS_1$ and $CCS_2$ and transistors $T_{15}$ and $DR_{16}$, is connected to the above-mentioned input stages of the differential amplifying circuit and output stages, thus forming a comparison circuit or mixer. Next, variable resistors $V_1$ and $V_2$ enter the photographic information such as film sensitivity, diaphragm value, etc. Transistors $T_5$, $T_6$, $T_7$ and $T_8$ form a direct-coupled amplifying circuit. An ammeter I indicates shutter speed. Next SM is a double-pole change-over switch, CM is a memory capacitor, and $T_{15}$, $T_{16}$, $T_{17}$ and $T_{18}$ are transistors constituting a regeneration circuit. $T_{11}$, $T_{12}$, $T_{13}$ and $T_{14}$ are transistors of the reference circuit to control the regeneration circuit for effecting expansion. A constant voltage circuit comprising a diode $D_2$ and transistors $T_{19}$, $T_{20}$, $T_{21}$ and $T_{22}$ is connected to the above-mentioned regeneration circuit and reference circuit. The output resistance of the output transistor $T_{18}$ of the regeneration circuit and the capacitor CT constitute a time constant circuit. A change-over switch SP is provided in the circuit, and a certain shutter speed required for flash photographing and for other cases can be obtained by changing over the output circuit of the transistor $T_{18}$ to the fixed resistors $RM_1$, $RM_2$ and $RM_3$.

$T_{23}$ and $T_{24}$ are input stage transistors for the differential amplifying circuit constituting a shutter speed control circuit, $T_{25}$ and $T_{26}$ are an output stage transistors of the same, $R_{19}$ and $R_{21}$ are bleeder resistors to give a reference voltage to one of input terminals of the differential amplifier, $T_{27}$, $D_4$ and $T_{28}$ are transistors for stabilizing circuits, $CCS_3$ is a constant current circuit. Next, $T_{29}$, $T_{30}$, and $T_{30}$ are transistors constituting a switching circuit, and this switching circuit controls the shutter closing time, namely a shutter closing member which is retained by an electro-magnet M is made to run with the current of the inverted output transistor $T_{30}$. SE and SS are power source switches, and E is a power source battery. $R_1$, $R_2$, $R_3$, $R_5$, $R_6$, $R_7$, $R_8$, $R_9$, $R_{10}$, $R_{11}$ and $R_{14}$ are resistors.

In operation the power source switch SE is closed and the change-over switch SM is connected to the side "a". The resistance of the photoelectric element P reaches a certain value determined by the light intensity from an object, and the output of the amplifying circuit comprising the transistors $T_1$ through $T_4$ reaches a value corresponding to the amount of the light incident upon the light receiving element. As there is a feed-back path between the collector of the transistor $T_4$ of the amplifying circuit and the base of the transistor $T_1$, the output voltage of the circuit corresponding to the amount of incident light at the photo-electric element is so compressed. Also as there is a feed-back connection in the photographic information setting circuit composed of transistors $T_5$ through $T_8$. The latter amplifying circuit resembles the above circuit. Thus the output voltage of the latter circuit with variable resistors $V_1$ and $V_2$ for entering photographic information such as film sensitivity and diaphragm value is also compressed. The outputs of these two circuits are applied to output stage transistors $T_{31}$ and $T_{32}$ through the input stage transistors $T_9$ and $T_{10}$ of the differential amplifying circuit. The latter activates an ammeter I whose indication previews the shutter speed before the shutter release. The outputs of the input stage transistors $T_9$ and $T_{10}$ are connected to both terminals of the memory capacitor CM through the change over switch SM, thus charging the capacitor CM to a certain value. This memorized voltage corresponds to the resistance value of the photo-electric element P and the entered values of photographic information. The compression characteristics of the both circuits may be matched together by adjusting the elements (for example a resistor $R_4$) in the circuits.

When a photo-electric element $R_{4p}$ having same thermal characteristics as that of the light receiving element P is used in place of the resistor $R_4$, the thermal characteristics of both circuits can be also matched together. The constant current circuits $CCS_1$ and $CCS_2$ are used in the differential amplifying circuit for stabilizing the function.

Next the power source switch SS is closed in association with the shutter start to activate the regeneration circuit. Before this the change-over switch SM is cut off from the side "a", then the mirror swings up, causing the shutter opening member to be operated. The switch SM is now switched over to the side "b". The voltage memorized by the capacitor CM is impressed on the input terminal of the transistor $T_{15}$ of the regeneration circuit, and the output resistance value of its output transistor $T_{18}$ corresponds to the memorized voltage. A control voltage is applied to the regeneration circuit from the control circuit consisting of the transistors $T_{11}$ to $T_{14}$ having a feed-back path. Thus the characteristics of the regeneration circuit is expanded through the compression characteristics of the control circuit. Hence the resistance variation due to the incident light to the photo-electric element P is responsively regenerated as the resistance value of output circuit of the transistor $T_{18}$ of the regeneration circuit. The transistor switching circuit is inverted by the delay of the time constant circuit comprising the output circuit of the transistor $T_{18}$ and the capacitor CT.

Next, the shutter speed control circuit excites the output stage transistors $T_{25}$ and $T_{26}$ through the input stages of the differential amplifier consisting of the transistors $T_{23}$ and $T_{24}$. A constant voltage is applied to one of the input terminals of the input stage transistors $T_{23}$ and $T_{24}$ by the bleeder circuit consisting of the resistors $R_{19}$ and $R_{21}$. The switching circuit consisting of transistors $T_{29}$, $T_{30}'$ and $T_{30}$ is inverted by the output of the output stages of the differential amplifier, releasing the holding of the shutter closing member which has been retained by the electro-magnet M, thus closing the shutter. For the purpose of stabilizing the operation of differential amplifying circuit, the circuit includes the stabilizing circuit composed of transistors $T_{27}$, $D_4$ and $T_{28}$ and the constant current circuit $CCS_3$.

As has been explained above, in the electric shutter control circuit of the present embodiment, the variation in resistance value of the photo-electric conversion element and the variation in resistance value of variable resistors for entering photographic information are compressed by the transistor amplifying circuit having a feed-back path, and the outputs of the two circuits are combined by the differential amplifier and in memorized as the terminal voltage of the memory capacitor. In the regeneration circuit an expansion function is achieved by controlling the regeneration amplifying circuit through the compression characteristics of the reference transistor amplifying circuit having a feed-back path. Since various kinds of stabilizing circuits are provided and their set up is suitable for the IC assembly, the apparatus functions very precisely and over a wide range as a control circuit for a memory type electric shutter. It operates in a very stable manner with respect to variation in temperature and supplied voltage, etc. Thus it is very useful as an electric shutter device of a high quality TTL single lens reflex-camera.

Figure 3:
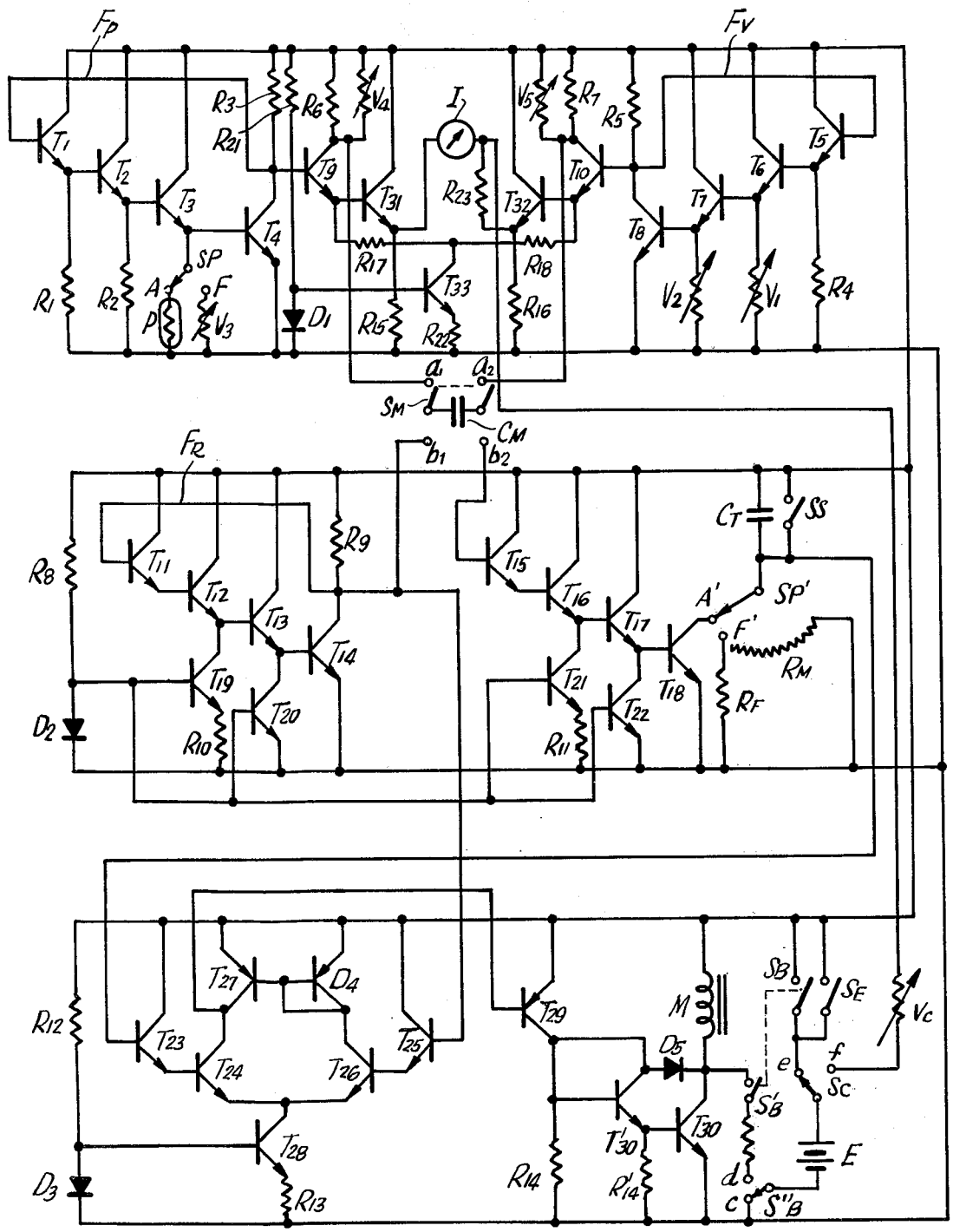
FIGS. 3, 4 and 5 show respectively the second, third and fourth embodiments of the control circuit according to the present invention.

Next, FIG. 3 is a circuit diagram showing an example of the electric shutter device according to the present invention. The drawing shows an electric shutter circuit employing direct coupled transistor circuits and containing a memory capacitor and a shutter speed indicating circuit, etc., and is structured so that the circuit can be easily assembled into an integrated circuitly. In the drawing component P is a photo-conductive element which, of a TTL camera, receives the light from an object through a photographing lens. A variable resistor $V_3$ is set by thr focusing ring or object distance adjuster of the photographing lens and is used to obtain luminosity corresponding to photoflash conditions. The variable resistor $V_3$ may be linked also with a manual operation for setting an exposure time. The photographing conditions and the photographing informations may be easily viewed within a finder. Component SP is a change over switch for a flash-auto photographing. Transistors $T_1$ through $T_4$ form a differential amplifying circuit, components $D_1$ and $T_{33}$ are a diode and a transistor forming the constant current circuit of the differential amplifying circuit, resistors $R_6$ and $R_7$ are load resistors. On the other hand transistors $T_{31}$, $T_{32}$ form a shutter speed indicating circuit and activate an ammeter with their combined outputs. Next, variable resistors $V_1$ and $V_2$ are provided at a direct coupled transistor circuit, consisting of transistors $T_5$ through $T_8$, and photographing information, that is, a diaphragm value and film sensitivity etc. are set. Each of the load resistors $R_6$ and $R_7$ of the above-mentioned light measurement circuit has one of the variable resistors $V_4$ and $V_5$ is connected respectively in parallel, and by adjusting these latter resistors $V_4$ and $V_5$, circuit characteristics and the gamma-value of the photo-conductive element and of the variable resistors for introducing and establishing photographing informations may be compensated.

A switchover switch SM switches a memory capacitor CM over from the side $a_1$, $a_2$ of the light measurement circuits to the side $b_1$, $b_2$ of the regeneration circuits during the camera release operation. Transistors $T_{11}$ through $T_{14}$ constitute a bias control circuit for regeneration circuit, components $D_2$, $T_{19}$ and $T_{20}$ are a diode and two transistors for voltage stabilizing in the control circuit, transistors $T_{15}$ through $T_{18}$ form an amplifying circuit of direct coupled type constituting a regeneration circuit, and $T_{21}$ and $T_{22}$ are voltage stabilizing transistors. The output of this regeneration circuit is connected to a time capacitor CT through the terminal A' of a change-over device consisting of, for example, a variable resistor RM which is associated with a shutter dial to be described later, a fixed resistor RF and a switch ST', etc. with the change-over device shutter speed may be selected manually through the variable resistor RM. A certain shutter speed may be further obtained through the resistor RF for flash photographing. Still further, the switch ST' allows a bulb exposure. On the other hand, SS is a start switch to become off by startup of shutter.

Next, $T_{23}$ through $T_{26}$ are transistors of differential amplifier constituting the first stage of a shutter speed control circuit, $D_3$ and $D_5$ are a diode and a transistor of its voltage stabilizing circuit. $T_{29}$, $T_{30}'$, $T_{30}$ are transistors of a switching circuit constituting the rear stage of the shutter speed control circuit, and M is an electro-magnet to actuate a shutter closing member. SB and SE are switches, VC is a variable resistor for adjusting a battery check circuit, SC is a change over switch for the checker circuit, and E is a power source battery.

The circuit of FIG. 3 operates as follows: First, the change over switch SC for the battery check circuit places the switches SB and SE of the power source circuit "on" by being connected to the side "e". As the switch S"B which is actuated by rotation of shutter dial is always connected to the side "c", the power source battery E is connected to the circuit. When the change-over switch SP is connected to the side A (auto), and the photo-conductive element P is connected to the circuit, the resistance value of the element P reaches a certain value responsive to the light intensity from an object. This generates an output corresponding to the amount of light incident into the light receiving element, at the output circuit of the transistor $T_4$ in the direct coupled (type) amplifying circuit. As there is a feedback path between the collector of the transistor $T_4$ of the amplifying circuit and the base of transistor $T_1$, there generated resistance value variation, in a compressed manner, corresponding to the amount of light incident to the light receiving element, at the output end. At the variable resistance $V_1$ and $V_2$ are provided at the circuit of transistors $T_5$ through $T_8$ constituting direct coupled amplifying circuit similar to the light responsive circuit, the film sensitivity and a diaphragm value are set respectively. As there is a feed-back path from the collector of the transistor $T_8$ to the base of the transistor $T_5$ at this amplifying circuit, the variation in the film sensitivity and the diaphragm value, which are set by variable resistors $V_1$ and $V_2$, are compressed and expressed at the output of the amplifying circuit. The outputs of these two circuits are combined and synthesized through the transistors $T_9$ and $T_{10}$ constituting a differential amplifying circuit as a mixer, and thus generating voltage at the load resistors $R_6$, $V_4$, $R_7$ and $V_5$ respectively connected to the collector of the transistors $T_9$ and $T_{10}$, and when the change over switch SM is connected to the side $a_1$, $a_2$, the side of the light measurement circuit, the combined output is transferred across the memory capacitor CM. Variable resistances $V_4$ and $V_5$ are connected in parallel to the load resistors $R_6$ and $R_7$ for effecting compensation of the characteristics of the above-mentioned two circuits, and if necessary of the gamma value of the photo-conductive element and of the variable resistors for setting informations, and the characteristics of both circuits are matched together by adjusting the valuable resistors $V_4$ and $V_5$. The shutter speed indicating circuit consisting of the transistors $T_{31}$ and $T_{32}$ is also connected to the above-mentioned two circuits, so that the shutter speed can be detected beforehand by the swing of a pointer of the ammeter I.

Next, for example, such a change over switch SM as will be described later is changed from terminals $a_1$ and $a_2$ to $b_1$ and $b_2$ is association with the pressing down of a camera release button. By this operation changes across the capacitor CM memorized before the actuation of shutter is applied to the regeneration circuit. One end of terminals of the capacitor CM is, connected to the direct coupled amplifying circuit having the feedback path consisting of transistors $T_{11}$ through $T_{14}$, thus generating a reference voltage having compressive characteristics at the output of this circuit. The gain of the regeneration circuit is controlled by this reference voltage, to bring expanding function to the regeneration circuit. A voltage stabilizing circuit is provided at these circuits. The memorized voltage added to the base of this transistor $T_{15}$ of the regeneration circuit is thus expanded and is added at its output transistor $T_{18}$, to introduce its aforementioned corresponding output resistance value in the transistor $T_{18}$.

With the change in output resistance value introduced in this way, the compression function of the light measurement circuit is eliminated by the expansion function of the regeneration circuit, and becomes responsive to the variation in resistance value due to the incident light onto the photo-conductive element P. The shutter speed control circuit is actuated through the time constant circuit consisting of this output resistor and the timer capacitor which determines a shutter speed, to obtain an optimum exposure value. That is, when the start switch SS is put "off" in association with the start up of shutter, the time capacitor CT is charged in correspondence with the output resistance value of the regenerating circuit, and the memorized voltage is added to the base of the transistor $T_{23}$ at one end of the differential amplifying circuit. On the other hand a stabilized reference voltage is added to the base of another transistor $T_{25}$ from the collector of the transistor $T_{14}$ of the direct coupled amplifying circuit, and its differential voltage is taken out as an output from the transistor $T_{24}$. By this output, the switching circuit consisting of transistors $T_{29}$, $T_{30}'$ and $T_{30}$ is actuated, and the transistor $T_{30}$ inverts from a conductive state to a non-conductive state with such a delay time as is determined by the time constant of the time constant circuit, and the retension of the shutter closing member which has been retained by an electro-magnet M is released, closing the shutter.

In the second embodiment of the present invention a change-over device is provided for selecting a desired shutter speed with manual operation being switched from EE, and the output resistance value of the transistor $T_{18}$ is changed over to the variable resistor RF by the shutter dial so that the shutter speed may be selected even by manual operation. Further, as the fixed resistor $V_3$ may be connected to the circuit by the change-over switch SP, the light measurement circuit can be activated as an exposure indicator or a shutter control circuit at a certain shutter speed.

At the same time by the change-over switch SC from the terminal "e" to the terminal "f" for checking the supplied voltage from the power source battery E, the battery may be checked with the ammeter I for indicating shutter speeds. If the power source switches, SE is placed in "on" state always while the shutter is in operation so that the circuit always properly functions for a long time exposure even if the release botton is put free during the exposure. The switch SB' which is linked with the power source switch SB causes current to flow from the battery E to the electro-magnet M through the contact "d" of the switch S"B which is changed over in an association with the dial, when the shutter dial is placed at the position of a bulb exposure. In this case, the circuit with the switches S'B' and S"B in a closed state prevents the damage of the transistor $T_{30}$ due to a long time current flow through the transistor $T_{30}$. That is, in the case of the bulb exposure, the switches S'B, SB becomes "on" by pressing down the release button, and the current from the battery E flows directly into the electro-magnet M through the change over switch S"B, thus holding the shutter closing member, and when the release button is left free, the switch S'B becomes "off", releasing the retention of the shutter closing member. In this way, damages caused by overheat etc. of the output transistor $T_{30}$ due to a long time exposure such as the bulb exposure may be eliminated.

Figure 4:
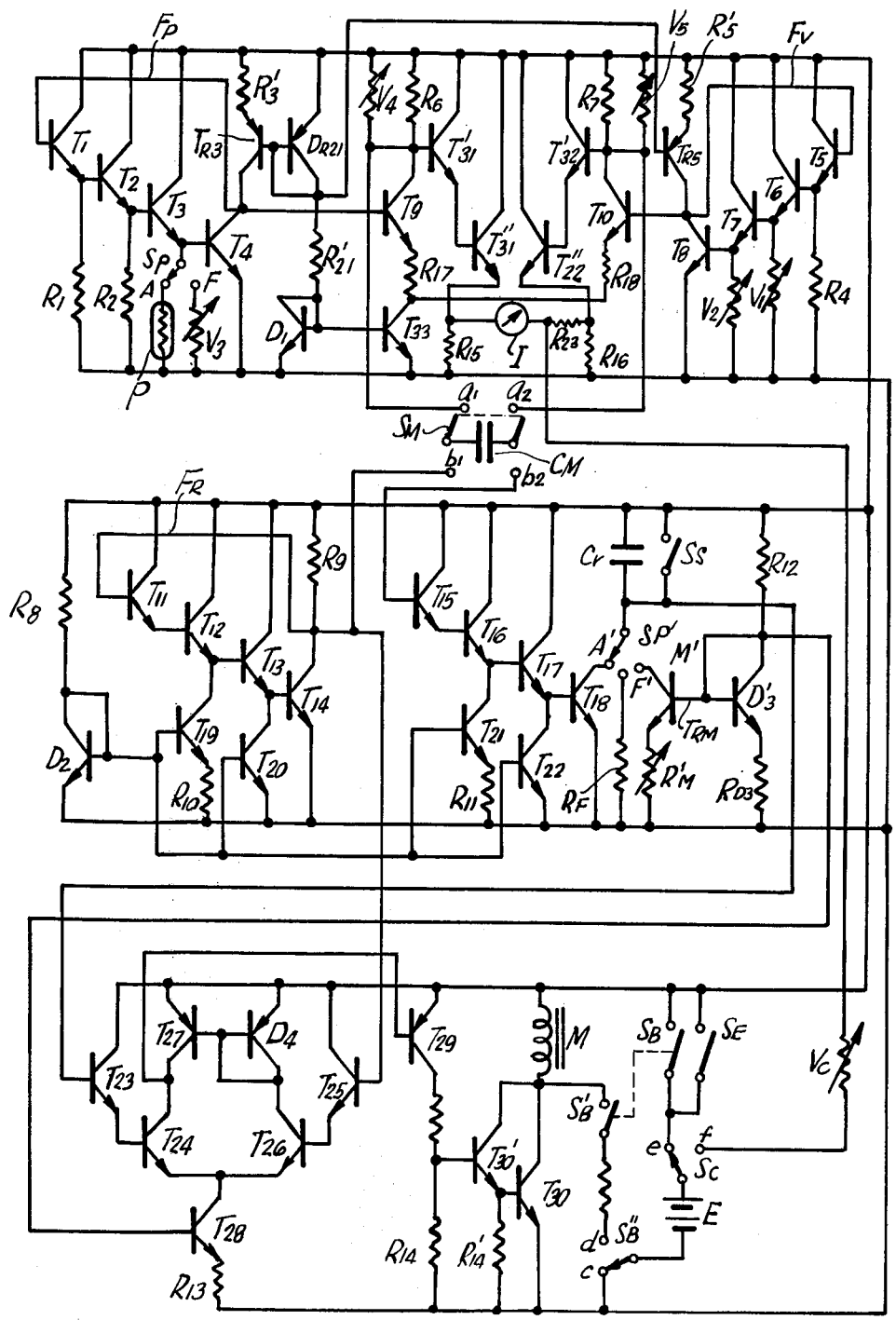

Now brief explanation shall be made on the third embodiment of the present invention referring to FIG. 4 with a stress being placed on the difference from FIG. 3.

First, each of the output load resistors of the output transistors $T_4$, $T_8$ of the photo-electric element circuit and the information setting circuit is made respectively as the resistances $R'_3$, $R'_5$ connected in series with the transistors $TR_3$ and $TR_5$ respectively and the bases of the transistors $TR_3$, $TR_5$ are connected to the transistor $DR_{21}$ which is used as a diode.

The transistor $DR_{21}$ is connected to the stabilizing circuit of the differential amplifier together with the transistor $D_1$ and the latter also functions as a diode.

Next, as an indicating circuit, the two amplifying circuits consisting of the emitter follower direct coupled transistors $T_{31}'$, $T_{31}''$ and $T_{32}'$ and $T_{32}''$ respectively, are employed not at the emitter sides of the transistors $T_9$, $T_{10}$ of the differential amplifier, but at the collector sides, and an ammeter I as a shutter speed indicating device is connected to the emitters of the transistors $T_{31}''$, $T_{32}''$.

Next, a transistor TRM is employed to compensate the characteristics of the variable resistor $R'M$ of the manually operated circuit for shutter speed, thus widening the range of the operable shutting speed, and to the base of the transistor TRM is connected the collector of the transistor $D'_3$, which is common with the stabilizing circuit of the first stage switching circuit consisted of differential amplifier and is diode connected.

Further, a resistor $R''_{14}$ is connected between the transistor $T_{30}$ and the transistor $T_{30}$, and the diode between the transistors $T_{30}'$ and the collector of the transistor $T_{30}$ in FIG. 3 is eliminated in FIG. 4.

In short, the embodiment shown in FIG. 4 is to provide an electronic shutter control circuit having little variation in response to the change in temperature, in which the diodes are replaced with equivalent circuits of transistors and at the same time some operational characteristics are improved, particularly with consideration for an integrated circuit assembly.

The device explained above is proposed to realize a memory type electronic shutter device chiefly for a TTL type single lens reflex camera, and it may also be so composed that a capacitor is eliminated and the terminal "a" of the light measuring circuit is always connected to the terminal "b" of the regeneration circuit, and further various modifications may be made. Now particularly examples of main mechanical parts as employed in a TTL type single lens reflex camera shall be explained in detail.

First, a mechanism for setting photographing informations was proposed previously in Japanese Patent Application No. Sho 45-4703, and a similar mechanism may be employed in the present invention.

Next, Japanese Patent Appliction No. Sho 44-102720 was proposed for the mechanical linked relationship such as a timing relationship between the mechanism for upswing of the mirror and the change-over of the memory capacitor, and similar relationship may also be employed.

Figure 5:
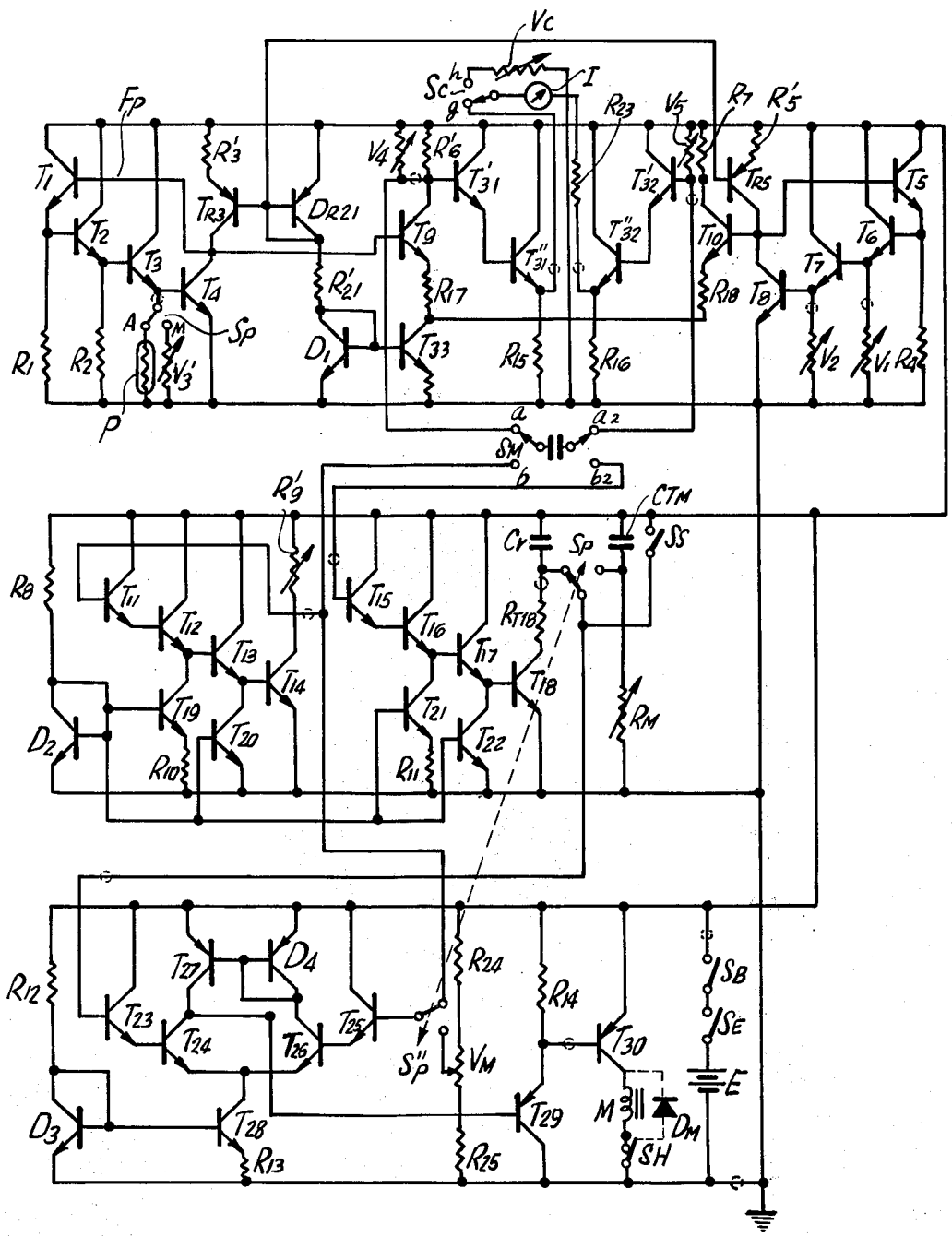

Next, FIG. 5 is a circuit connection diagram showing the fourth embodiment of an electric shutter device according to the present invention. The drawing shows an electric shutter circuit using transistors and containing a memory circuit with a capacitor, and a shutter speed indicator circuit, etc., and is so arranged that the circuit can be easily fitted with an integrated circuit assembly. In the drawing, P is a photo-conductive element and receives light from an object through a photographing lens in case of a TTL camera. $V'_3$ is a variable resistor in a linked relationship with a photographing distance information of a lens, and is used to obtain such amount of illumination as corresponding to the photographing conditions in case of flash photographing. The resistor $V'_3$ can also be linked with a manual time setting resistor RM to indicate a manually set value within a finder. SP is an auto flash change-over switch. $T_1$ through $T_4$ are transistors composing a direct coupled type amplifier circuit, $T_9$, $T_{10}$ are transistors composing a differential amplifier circuit, $D_1$ and $T_{33}$ are transistors composing a constant current circuit for a differencial amplifier circuit, and $R_6$ and $R_7$ are load resistors. The transistors $T_{31}'$, $T_{31}''$, $T_{32}'$, $T_{32}''$ compose a shutter speed indicator circuit and causes an ammeter I to be actuated by their output. Next, variable resistors $V_1$ and $V_2$ are provided at a direct coupled type amplifier circuit comprising transistors $T_5$ through $T_8$, and photographing information such as diaphragm value, film sensitivity, etc. can be set by the resistances. Transistors $TR_3$, $TR_5$ are connected in series to the load resistors $R_3'$ and $R_5'$ in a collector circuit of the output transistors $T_4$, $T_8$ of a photometric circuit, and information setting circuit, and the bases of the transistors $TR_3$, $TR_5$ are connected to a transistor $DR_{21}$ of diode connection. Variable resistors $V_4$ and $V_5$ are connected in parallel with load resistors $R_6$ and $R_7$ respectively of a memory circuit, so that the circuit properties and gamma value of photo-conductive element and variable resistances for setting information can be corrected by adjusting the former two resistors $V_4$ and $V_5$. By employing this kind of circuit the variation in output from the direct coupled circuit having a feed-back path is reduced by 18 mV per a unity of exposure value.

Next, CM is a memory capacitor, and is changed over from the memory circuit of $a_1$ and $a_2$ side to a regeneration circuit of $b_1$ and $b_2$ side by a change over switch SM in a linked movement with shutter actuation. $T_{11}$ through $T_{14}$ are transistors composing a bias control circuit of the regeneration circuit, $R_9'$ is an adjusting resistor, $D_2$, $T_{19}$ and $T_{20}$ are voltage stabilizing transistors for the above-mentioned control circuit, $T_{15}$ through $T_{18}$ compose a direct coupled amplifier circuit as for the regeneration circuit, and $T_{21}$ and $T_{22}$ are transistors for the voltage stabilizing circuit for the regeneration circuit. The output of this regeneration circuit will be connected to a capacitor CT through for example a resistor $RT_{18}$. Ss is a switch which is put off by the start-up of a shutter, SP' is an auto-manual change over switch, RM is a variable resistor being linked with the shutter dial to be described later and is used for manually setting shutter speed, and CTM is a capacitor for the variable resistor RM. Next, $T_{23}$ through $T_{25}$ are transistors of a differential amplifier comprising a first step of a shutter speed controlling circuit and $D_3$ and $T_{28}$ are transistors for the voltage stabilizing circuit of the differential amplifier, and SP" is a change over switch being linked with the switch SP'. VM is a variable resistor for a bleeder circuit and adjusts a reference or bias voltage in the case of a manual operation. $T_{29}$ and $T_{30}$ are transistors for a switching circuit composing the latter step of the speed control circuit, and M is an electro-magnet to actuate shutter closure. SH, SE and SB are switches, VC is a variable resistor for adjusting a battery check circuit, SC is a change over switch for the check circuit, and E is a power source battery.

Next the function of the above fourth embodiment shall be explained.

First the change over switch SC for the battery check circuit is brought into such state as connected to "g" side, and the switches SE and SB of the power source circuit is brought in an "on" state. The switch SH will be put in "on" position just before the actuation of the shutter and put in "off" position by the shutter closure, so that the power consumption of the battery by the electro-magnet M is reduced. When the change over switch SP is connected to A (auto) side, the photo-conductive element P is connected to the circuit, and the resistance value of P will take a certain value by the light from an object, generating such output as corresponding to the amount of incident light into the light receiving element P at the output circuit of the transistor $T_4$ for the direct coupled amplifier circuit. Because there is a feedback path FP between the collector of the transistor $T_4$ of the above-mentioned amplifier circuit and the base of the transistor $T_1$, such variation in the resistance value as corresponding to the amount of incident light of the light receiving element will be generated at an output end in a compressed manner. On the other hand, variable resistors $V_1$ and $V_2$ are provided at the circuit of the transistors $T_5$ through $T_8$ composing a direct coupled amplifier circuit which is similar to the above-mentioned amplifier circuit, and film sensitivity and diaphragm value are set at said resistors. As there is a feed-back path FP in the latter amplifier circuit from the collector of the transistor $T_8$ to the base of the transistor $T_5$, the variation in the film sensitivity and diaphragm value which are set by the variable resistors will be indicated in the output of the amplifier circuit in a compressed manner.

The output of these two direct coupled amplifier circuits will be combined by the transistors $T_9$ and $T_{10}$ composing a differential amplifier circuit, generating voltage at the load resistors $R_6'$, $R_7$, $V_4$, $V_5$ being connected to the collector, and will be memorized in a memory capacitor CM as the change over switch SM is connected to $a_1$ and $a_2$ for memorization.

The variable resistors $V_4$ and $V_5$ are connected in parallel with the load resistors $R_6$ and $R_7$, for correcting the properties of the above-mentioned two direct coupled amplifier circuits and the gamma value of the photo-conductive element P and the variable resistor for setting information, and the properties of the both amplifier circuits are made to match to each other by adjusting the variable resistors $R_6$ and $R_7$. A shutter speed indicator circuit which comprises transistors $T_{31}'$, $T_{31}''$ and $T_{32}'$, $T_{32}''$ is connected to the above-mentioned two amplifier circuits, so that a shutter speed can be foreseen by the indication of the ammeter I.

Next, the change over switch SM is changed over from $a_1$ and $a_2$ to $b_1$ and $b_2$ in a linked movement with pushing down of a shutter release button. By this, the charges stored across the capacitor CM being memorized before the shutter is activated is impressed to the regeneration circuit. One terminal of this capacitor CM will be connected to the direct coupled amplifier circuit having a feed-back path FR comprising the transistors $T_{11}$ through $T_{14}$, generating such voltage as having stabilization characteristics at the output of the amplifier circuit. The gain of the regenerator circuit is controlled by the constant voltage, effecting elongation function to the regeneration circuit. The voltage stabilizer circuits are provided at these circuits. Thus the memorized voltage supplied to the base of the transistor $T_{15}$ of the regeneration circuit is expanded and is given to its output transistor $T_{18}$, varying its output resistance value. This variation in the output resistance value will become equivalent to or if required correspond to the variation in the resistance value by the incident light for the photoconductive element P, as the compressed value of the memory circuit is inversely expanded by the expansion action of the regeneration circuit.

By this output resistance value and the time constant factor of the capacitor of the time constant circuit which determines the shutter speed, the shutter speed control circuit is actuated to obtain an appropriate exposure value. That is, as the switch SS is put in an "off" position in a linked movement with start-up of the shutter, the capacitor CT is started to be charged corresponding to the output resistance value of the above-mentioned regeneration circuit, and the terminal voltage across the capacitor CT is given to the base of the transistor $T_{23}$ at one side of the differential amplifier circuit. At the same time the stabilized voltage is given to the base of the other transistor $T_{25}$ from the transistor $T_{14}$ of the direct coupled amplifier circuit, and their differential voltage is taken out as its output from the collector of the transistor $T_{24}$. In this case the effect of variation in the capacity of the capacitor CT can be eliminated by the adjusting resistor $R_9'$.

By the output, the switching circuit comprising the transistors $T_{29}$ and $T_{30}$ is actuated, and the transistor $T_{30}$ is inverted from a conductive state to nonconductive state with such delay time as determined by the time constant factor of the time constant circuit, thus releasing the shutter closing member which has been retained back by the electro-magnet M to close the shutter.

A change over device for changing over the shutter from EE to manual for selecting desired shutter speed is provided in the device of the present invention, and first switches SP', SP" are changed over from A' to M', respectively for selecting the shutter speed manually. By this, the time constant circuit acts for manual operation by connecting the capacitor CTM to the variable resistor RM for speed setting. And the reference voltage to the differential amplifier will be given from the sliding terminal of the bleeder resistor VM, thus the variation in the power source voltage is offset by the differential amplifier. Also by changing over the change over switch SP from the terminal A to the terminal M, the fixed resistor $V'_3$ of the present device is connected to the circuit so that the photometric circuit can be adtivated as the shutter circuit with a control shutter speed.

When the change over switch SC is changed over from g to h for checking the terminal voltage of the power source battery E, the serviceability of the battery can be checked by using the ammeter I for shutter speed indication. Although such system, which has been employed as measuring the emitter circuit of the transistor $T_{32}''$, is employed for simplifying the set-up of the circuit, the error by this can be disregarded. This is because the variation in the output of the second direct coupled circuit is made extremingly small by providing a feed-back path and socalled quasi-stable output in this embodiment can be obtained by thus making the variation in output small through providing a feed-back path. At the same time, in order to reduce the power consumption of battery by the electro-magnet M as much as possible, such switch SH as becoming "on" just before activation of shutter and becoming "off" with shutter closure action is inserted in the output circuit.

When the switch SE is used as a main switch, the switch SB which is connected in series with the switch SB will be placed in "off" position at the time of bulb exposure or of long time exposure, thereby the consumption of battery can be reduced.

Figure 6:
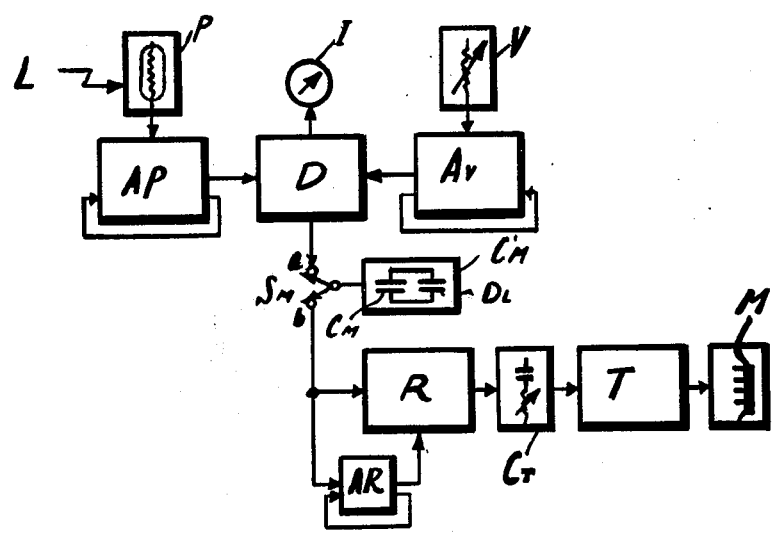
FIG. 6 is a block diagram of the control device of the present invention with a modified memory device.

FIG. 6 shows a block diagram of a similar shutter control device of the present invention to that shown in FIG. 1 except for the memory device CM'.

The memory device CM' comprises a latch diode DL provided in parallel with a memory capacitor CM, which latch diode latches the detector to prevent an errorneous operation of the detector due to manufacturing irregularities.

Particularly when the memory switch SM is changed over to the terminal 6 and a memorized value across the memory capacitor CM corresponds to a rather long exposure time, the regenerator R under the control of the reference amplifier AR fails to maintain the memorized value at a constant value during the rather long exposure time.

Figure 7:
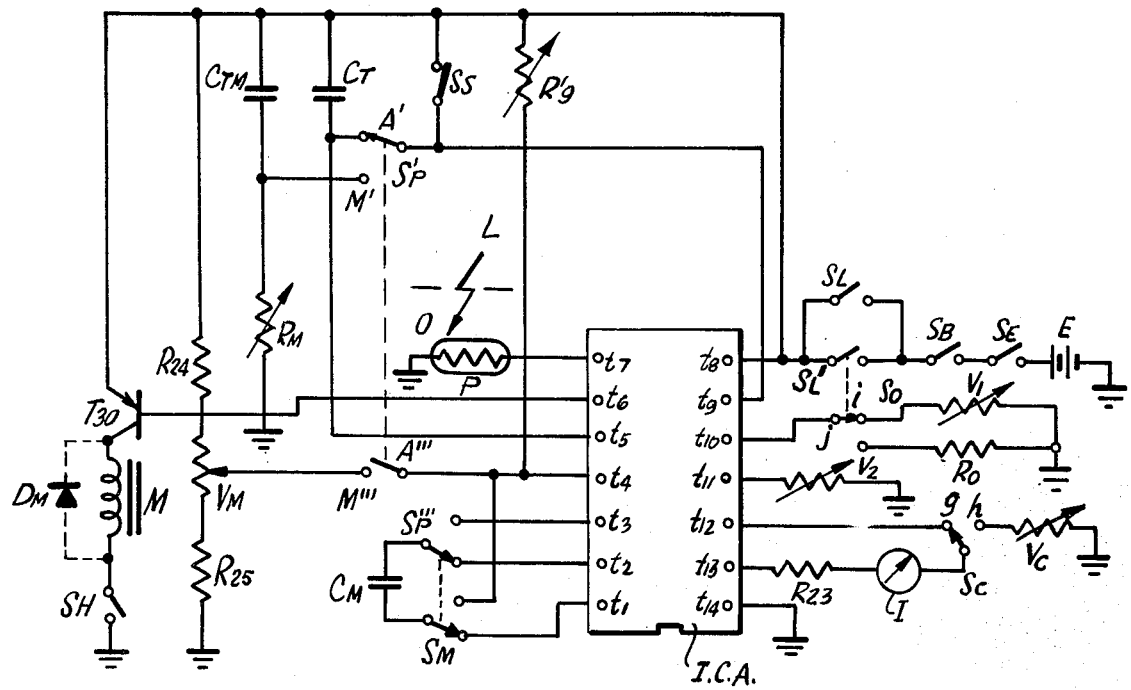
FIGS. 7 and 8 show respectively the fifth and sixth embodiments of the control circuit according to the present invention.

Further, brief explanation shall be made on the fifth embodiment of the present invention referring to the FIG. 7 mainly about its difference from FIG. 5.

In FIg. 7 ICA shows an IC assembly, having as total of 14 terminals consisting of external terminals $t_1$, $t_2$ ... $t_{14}$. The parts shown as $t_1$, $t_2$ ... $t_{14}$ in FIG. 5 correspond to the terminals. $t_{14}$ is a ground terminal, $t_{10}$ is a diaphragm information terminal, $t_8$ is a power source terminal, and $t_4$ is a regeneration control terminal. The ground terminal $T_{14}$ is for body grounded, and each point in the circuit has all plus electric potential. The drawing shows the case when a through-the-stopped-down aperture measuring switches SL' and So, a lens signal switch SL and an aperture correction resistor Ro for a fully opened diaphragm are further incorporated to the diaphragm information terminal $t_{10}$ and the power source terminal $t_8$ beside the circuit elements of FIG. 5, these incorporated means are provided so that they can be changed over for only the through-stopped-down aperture sensing when a lens for the through-stopped-down aperture sensing is provided and changed over for both light sensing system when a through-the-fully-opened aperture sensing lens is coupled by providing at the interchangeable lens for example a signal pin for the difference in the lens types, that is, lenses for a through-the-stopped-down aperture sensing and a through-the-fully-opened aperture sensing. While the switch SL is closed by the signal pin provided at the lens for a through-the-fully-opened aperture sensing, the switch SL remains opened is the case of the lens for a through-the-stopped-down aperture sensing. In the former case, the diaphragm information is given to the resistor $V_1$. The switches SL' and So are linked with each other and the switch SL' is opened to connect the switch So at the terminal i at the time of the through-the-fully-opened aperture sensing. When the lens for a through-the-stopped-down aperture sensing or the lens for a through-the-stopped-down aperture sensing is coupled at the time when the linked switch SL' is closed and the linked switch So is connected to the terminal j, the diaphragm information is ready to be introduced by the diaphragm provided in front of the photo-conductive element P. It is needless to say that in the case of the lens for a through-the-fully-opened aperture sensing, a change over mechanism is needed at a camera or at the lens for through-the-stopped-down aperture sensing. While the switch SP''' within the external circuit connected to the regeneration control terminal $t_4$ performs similar functions as those of the change over switch SP'' shown in FIG. 5, in this case the switch SP'' is always fixed to the terminal A'', and said set-up shown in FIG. 7 corresponds to such arrangement as either connecting the switch SP' to the terminal A' or the terminal M' by the control of the switch SP''' and the switch SP''' is either connected to the terminal A''' or the terminal M''' in a corresponding manner. The switch SP''' has almost no relationship with the output of the terminal A''' but is derived by that the terminal M''' actuates the differential trigger circuit at the time of manual operation.

Because the timer capacitor is not used for dual purposes, such simple circuit composition as the resistance RM and the capacitor CTM of the time constant circuit for manual operation can be easily employed at the time of manual operation.

The device which has been explained above is proposed to embody a memory type electronic shutter device chiefly for TTL type single lens reflex camera, and such set-up can be employed that the capacitor is omitted and the terminal a ($a_1$, $a_2$) of the photo-metering circuit is connected always to the terminal b ($b_1$, $b_2$) of the regeneration circuit, furthermore various other modifications are possible. Now, detailed explanations shall be made especially for the case when used for TTL type single lens reflex camera on an example of the main parts of mechanical set-up.

Figure 8:
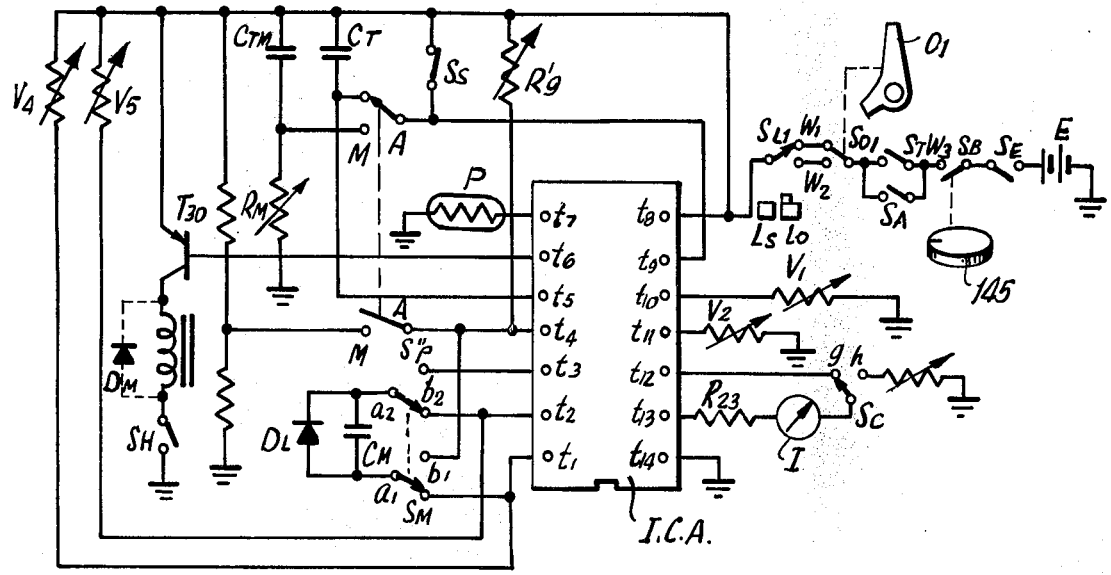

FIG. 8 shows the sixth embodiment of the present invention which is a modification of the camera system construction shown in FIG. 7.

In FIG. 8, the latch diode LD is connected in parallel with the memory capacitor CM, the trimmer resistors $V_4$ and $V_5$ are fixedly connected between the terminal $t_8$ and the terminals $t_1$ and $t_2$ respectively, and the variable resistor $V_1$ is fixedly connected to the terminal $t_{10}$. The photo-electric conversion element P receives the light from the object to be photographed either through one Lo of the interchangeable lens for through-the-fully-opened aperture sensing or through one Ls of the interchangeable lenses for through-the-stopped-down aperture sensing.

$SL_1$ is a lens switch normally connected to a lead connection $W_2$ and is changed over to a lead connection $W_1$ by a signal pin of the lens Lo. The switch $SL_1$ retains the normal connection with the lead wire $W_2$ when the lens Ls is coupled with the camera.

$So_1$ is an operable switch normally connected to the lead connection $W_1$ and is changed over to the lead wire $W_2$ by a manually operable lever $O_1$. $W_3$ is a normally closed switch which is engaged with a shutter dial Os so as to open the switch $W_3$ when the shutter dial Os is set to bulb exposure. ST is a normally opened switch for self-timer. At the finishing of the self-timer the timer switch ST is closed for shutter activation. SA is a normally opened activation switch which is preferably closed by a shutter button, and SE shows a main switch for activating the system. The timer switch ST and the activating switch SA are provided in parallel with each other between the switch $So_1$ and the bulb switch $W_3$.

The above connection of the switches and the lead connections are effective for fool proof of the system.

The circuits composing IC assembly as shown in FIGS. 9 through 12 are shown with thin lines in FIGS.

3 and 4, while the parts connected to the IC assembly are shown with thick lines in FIGS. 3 and 4.

Figure 9:
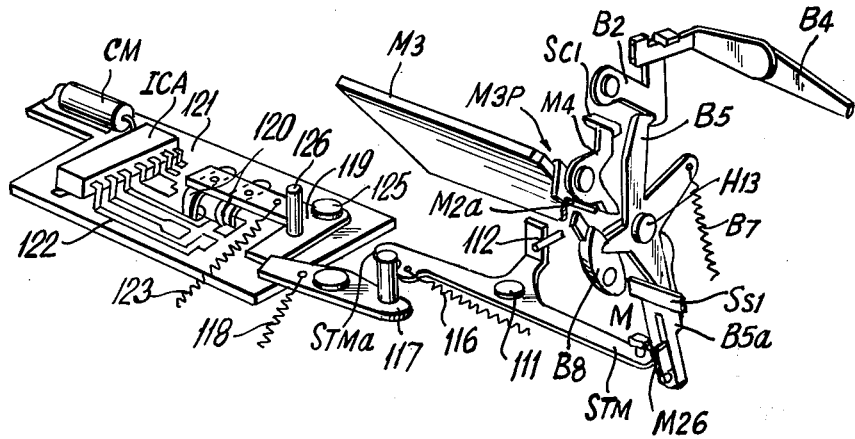
FIGS. 9 to 11 show mechanical constructions of the memorising mechanism according to the present invention.

Now detailed explanations shall be made on concrete examples on this improved main mechanical parts referring to FIG. 9 through FIG. 12. In FIG. 9 when a shutter button (not shown in the drawings) is pressed in the direction of an arrow in FIG. 9, a lever $B_4$ rotates and an anchor lever $B_2$ is rotated around an axle in a counter clockwise direction. A main lever $B_5$ is rotated in a clockwise direction around an axle $H_{13}$ by a spring $B_7$, and at the same time a pawl lever $B_8$ located above a mirror driving lever $M_2$ is rotated in a clockwise direction, then one end $M_{2a}$ of the mirror driving lever $M_2$ pushes a push-up pin $M_{3p}$ of the mirror $M_3$, thus causing the mirror $M_3$ to ascend. One end $M_{2b}$ of the mirror driving lever $M_2$ rotates an automatic diaphragm lever STM around an axle 111 in a clockwise direction. Then, the latter lever STM strikes a diaphragm pin 112 at the lens side, thus the lens (not shown in the drawing) is made to have a desired preset diaphragm value.

A lock lever $SS_1$ for a shutter (not shown in the drawing) is actuated by one end $B_{5a}$ of the main lever $B_5$, thus actuating the shutter, and a rear shutter screen is released by as electro-magnet after a prescribed period of time, then as the screen completes its run, a lever $SC_1$ is actuated to rotate a forked lever $M_4$ around an axle in a clockwise direction, thus releasing the engagement of the pawl lever $B_8$ with the main lever $B_5$. Therefore, the mirror driving lever $M_2$ rotates around the axle $H_{13}$ in a counter-clockwise direction, the mirror $M_{31}$ returns to the oblique original position, and the automatic diaphragm lever STM is rotated by a spring 116 around the axle 111, returning the diaphragm to a released state.

A fixing lever 117, which engages with one end STMa of the automatic diaphragm lever STM, is biased by a spring around an axle in a counter-clockwise direction. Generally speaking, it is necessary from a viewpoint of manufacturing and from that of performance to have a clearance for the automatic diaphragm mechanism and the mirror driving mechanism in the driving mechanisms particularly for a camera with an interchangeable lens. With this clearance, said fixing lever 117 releases the fixed engagement of the lever 117 with a reciprocating member 119 by the action of the automatic diaphragm lever STM, and a contact piece 120, which is insulated and supported on the reciprocating member 119, makes a conductive body 122 with a high durability and a high friction resistance run instantaneously by a spring 123, and the output of the memory capacitor of the electric circuit is changed over to the regeneration circuit. ICA shows an example of DIP (Dual In-line Package) which has been applied into an integrated circuit assembly, and CM the memory capacitor, CM is incorporated in a compact manner on a printed board 121.

A pin 126 on the above-mentioned reciprocating member 119 charges the film at the time of shutter charging in association with a winding up lever (not shown in the drawing).

Figure 10:
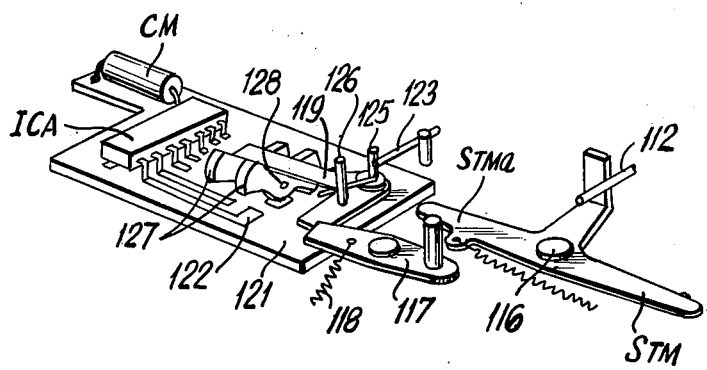

FIG. 10 shows an example wherein a contacting piece 127 with three contact points is placed on the printed board 121 in place of the contact piese 120 insulated and supported on the reciprocating member 119. In the case of FIG. 10, the contacting piece 127 with three contact points moves in a seesaw-like manner by the reciprocating member 119 around a central axle 128, thus changing over the switches SM.

Figure 11:
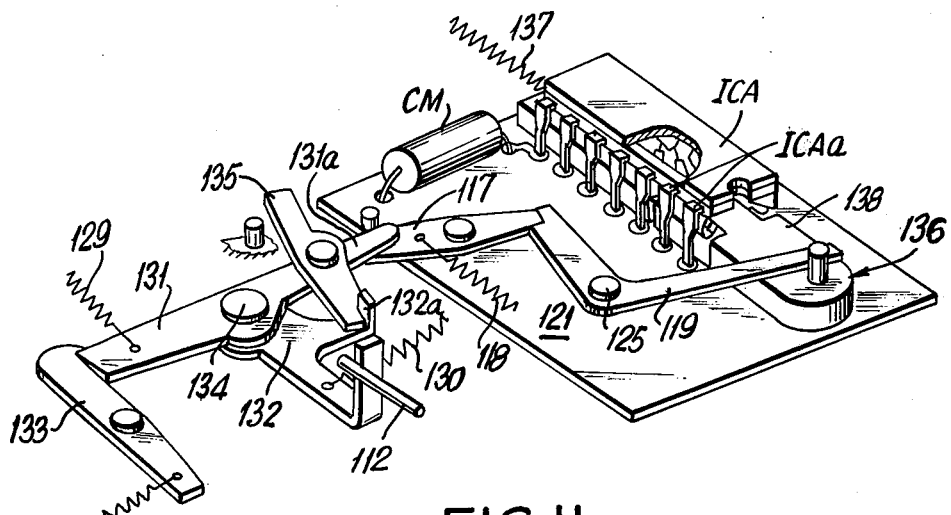
Figure 12:
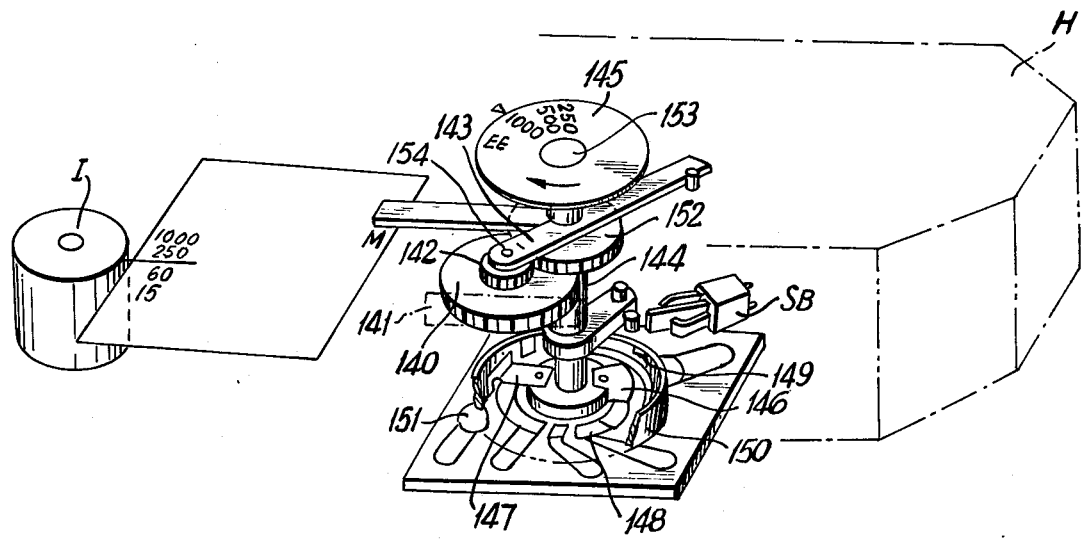
FIG. 12 is a mechanical construction of the manual information setting mechanism according to the present invention, particularly for the second and the third embodiments of the present invention.

FIG. 11 shows another modification. In this case, a mechanism of the switches SM is shown in a case in which each of a mirror up-swing mechanism and an automatic diaphragm mechanism runs independently, wherein the change over is directly made with terminals of DIP or terminals of a socket.

Detailed explanation will be made. The drawing shows a state after winding up, wherein a fixing lever 133 is locked with an automatic diaphragm group of members 131 and 132 each having two respectively strong and weak springs 129, 130 in addition to the mirror driving mechanism.

When the fixing lever 133 rotates, the automatic diaphragm driving lever 131 rotates around an axle 134 in a clockwise direction, and a pawl part 132a of the automatic diaphragm lever 132 is rotated by a notch in a lever 135 axially supported on the automatic diaphragm driving lever 131, and thus the lens has a desired preset diaphragm value by a diaphragm pin 112.

The fixing lever 117 is rotated by the spring 118 through an action of the one end 131a of the automatic diaphragm driving lever 131, and the reciprocating member 119 is rotated around the axle 125 in a counter-clockwise direction by a spring 137 for a slide lever 136.

Within the slide lever 136, a contact piece 138 which is equivalent to switches 7, 38 contacts a terminal ICAa of the DIP ICA. The slide lever 136 moves to the left by the rotation of the reciprocating member 119, thus changing over the switches SM.

The IC assembly has been explained above in conjunction with the shutter mechanisms. Next the relation with the shutter dial shall be explained in detail on an example referring to FIG. 12. In the drawing, a shutter dial knob 140 is located at a side window 141 at the eye-piece side of an upper housing of a camera, and may be changed over from E—E to a manual shutter speed, and as the shutter dial knob 140 is rotated around the axle, a shutter dial axle 144 rotates through gears 142, 152, and thus the shutter-speed is indicated on an indicator plate 145. At the same time contracting pieces 146, 147 fixed on the axle 144 slide on a printed board 148 and on a variable resistance element 149. And the shutter speed may be, beside EE(A), changed over manually from high speed to low speed and finally to bulb, and the switch 16 is switched in a linked manner to the terminal F by adjusting the shutter dial knob 140. In this way the knob 140 can be linked with a flash auto mechanism. A variable resistance element 149 of flexible nature is fixed on a drum 150 by a support plate 151.

Further, the shutter dial 140 may be brought into the inside of the window 141 of the upper housing only in the case of EE by a lever 143 on the shutter dial knob 140, thus preventing unexpected rotating. On the other hand it may be so composed that various informations may be indicated within a view of field of the finder by such means as a lamp, etc., and in this case digital indication means etc. may be connected in place of an ammeter. It may be so composed as shown in the drawing to indicate the photographing conditions and the shutter speed by mechanical linkage.

Figure 13:
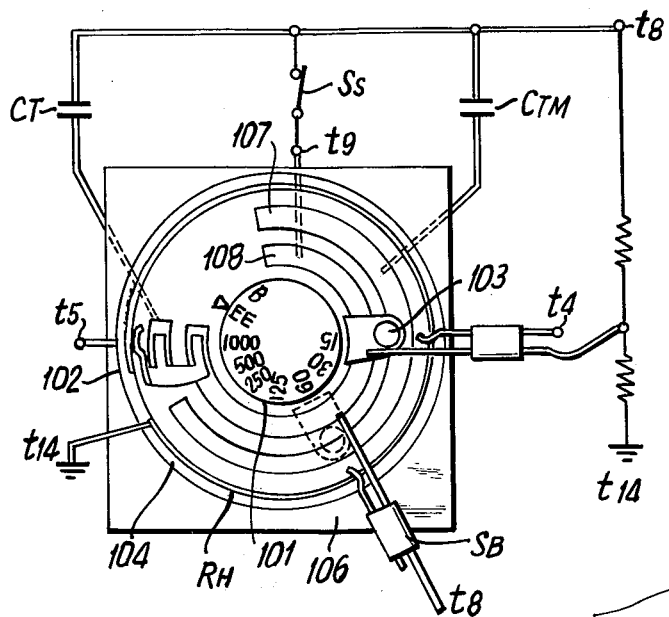
FIG. 13 is another mechanical construction of the manual information setting mechanism according to the present invention, particularly for the fourth, fifth and sixth embodiments of the present invention.

Next, detailed explanation shall be made on an example for the relationship between the shutter dial and IC assembly, referring to FIG. 13. In FIG. 13, 101 is a shutter dial shown schematically in a diagram system, and a contacting piece 102 and an insulating lever 103 are provided thereto in an engaging relationship. 104 is a cylinder having a variable resistor RM at its inner wall, and is supported on a printed circuit board 106.

And on the board 106, metal membrances 107, 108 are provided, and the auto-manual change over (A'.M'.) can be done simultaneously by the contacting piece 102. The variable resistor RM is for manual operation and SB is a switch for bulb. CT and CTM show the capacitors explained before and SS shows the start switch explained above. $t_4$, $t_5$, $t_8$, $t_9$ and $t_{14}$ are external terminals of the above-mentioned IC assembly.

Next a power switch control mechanism will be described in details referring to FIGS. 14 to 19.

Figure 14:
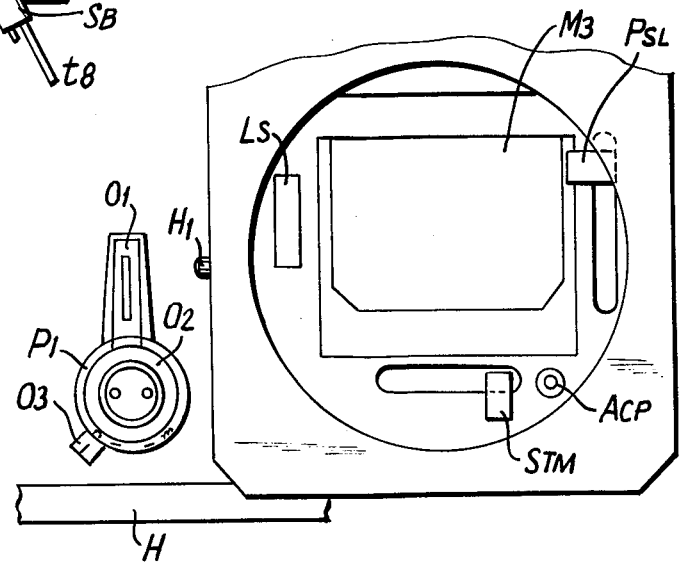

As shown in FIG. 14, on the front face of the camera are provided the operable lever $O_1$ and a control lever $O_3$. $H_1$ is a stopper projection for the operable lever $O_1$, provided on the camera body H. The operable lever $O_1$ rotates in a clockwise direction until it reaches the stopper projection $H_1$. The control lever $O_3$ is changeable for indications n, l, and m on the fixed member $P_1$. $O_2$ is an operation member fixed to the operable lever $O_1$ through a fine adjustment mechanism. Ls is a lens sensor which activates only when an interchangeable lens for through-the-full-opened aperture is coupled, $Ps_L$ is a pre-set lever for pre-setting F number in a variable resistor $V_1$ only when an interchangeable lens for through-the-full-opened aperture is coupled, Acp is an aperture correction movable pin for connecting differences in full-opened aperture among the interchangeable lens and STM is a lever for stopping down the iris to a preset position. $O_{12}$ is an eccentric pin for the fine adjustment of the position of the operable lever $O_1$ in respect to the position of the operation lever $O_2$. $O_{2c}$ and $O_{3c}$ are cam portions which are moved by the operable lever $O_1$ and the control lever $O_3$ respectively. $O_{2p}$ is a pin planted on the cam $O_{2c}$, which serves to change over the switch $So_1$, and $H_2$ to $H_6$ are insulator members fixed on the camera body H for insulating the switches $W_3$, $So_1$ and $SL_1$ and the lead wires $W_1$ and $W_2$.

The above switches and the lead wires are conveniently constructed as shown in details in FIG. 19. The functions of the cams $O_{2c}$ and $O_{3c}$ will be described in reference mainly to FIG. 16.

First description will be made in case the control lever $O_3$ is set at the position n. In this case, supposing that an interchangeable lens for through-the-fully-opened aperture is coupled with the camera body H and the operable lever $O_1$ is not operated, when the shutter button $B_1$ is pushed down against a spring $B_3$ provided between the pin $H_8$ planted on the camera body H and the pin $B_{1p}$ planted on the shutter button $B_1$, the actuator switch SA which has been normally opened is closed. The switch SA is integral with the switch ST.

Figure 18:
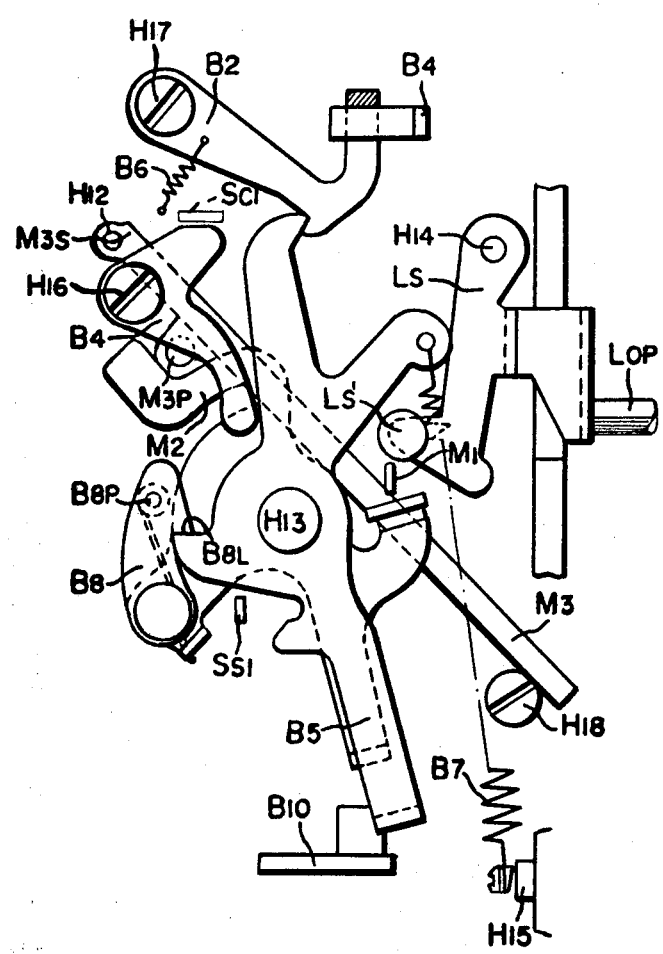

While the projection $B_{13}$ rotates a release lever $B_2$ in a counter clockwise direction as shown in FIG. 18 through an intermediate lever $B_4$ to permit an intermediate member $B_5$ to rotate in a clockwise direction around the axis $H_{17}$. $B_6$ and $B_7$ are springs for biasing the release lever $B_2$ and the intermediate member $B_5$ respectively.

The mirror-up member $M_2$ and the intermediate member $B_5$ rotate in a clockwise direction integrally by aid of a latch member provided on the mirror-up member $M_2$ through a spring $B_7$ provided between the pin $H_{15}$ and the intermediate member $B_5$ to swing up the reflex mirror $M_3$ around the axis $H_{12}$ against the spring $M_{3s}$.

$M_{3p}$ is a pin on the reflex mirror $M_3$, which pin engages with the mirror-up member $M_2$. By the integral rotation in a clockwise direction of the mirror-up member $M_2$ and the intermediate member $B_5$, the shutter starter member $S_{sl}$ is actuated to start shutter operation. At the time of the shutter operation completion, a shutter completion member $S_{cl}$ rotates a mirror-down controller $M_4$ in a clockwise direction around the axis $H_{16}$ to release the engagement of the intermediate member $B_5$ with the lock member $B_8$ with the aid of the pin $B_{8p}$ on the latch member $B_{8L}$, and thus the mirror-up member $M_2$ is rotated in a clockwise direction, while the intermediate lever $B_5$ remains to contact with the mirror-down controller $M_4$ by the spring $M_{3s}$ through the pin $M_{3p}$ to bring back the mirror to a position where it is stopped by the stopper $H_{18}$.

Then by film winding-up operation, a shutter charging member $B_{10}$ rotates the intermediate member $B_5$ in a counter-clockwise direction to a position where the release lever $B_2$ and the intermediate member $B_5$ are interlocked together, and the latch member $B_{8L}$ and the intermediate member $B_5$ are interlocked together.

In this way, the device returns to the original state as shown in FIG. 18. The intermediate member $B_5$ and the mirror-up member $M_2$ are coaxially provided on the axis $H_{13}$.

The rotation in a clockwise direction of the operable lever $O_1$ should be avoided in the above operation as the camera is constructed for through-the-fully-opened aperture sensing with the aid of the pin $L_{op}$ of the lens $L_o$.

An isolator pin $L_{s'}$ fixed on the lens sensor lever Ls supported on an axis $H_{14}$ brings the switch $SL_1$ to contact with the lead connection $W_1$.

The rotation in a counter-clockwise direction of the operable lever $O_1$ permits the charging of the self-timer independently on the above operation as the timer-switch portion ST of the switch $W_3$ is provided in parallel with the activator switch SA mechanism of which is not shown. A pin $O_{2p}$ of the cam $O_{2c}$ serves to charge the self-timer.

In case of the intercoupling of the lens Ls and the camera, and when the operable lever $O_1$ is operated manually under the condition of the control lever $O_3$ set at the indication n for a normal operation, the pin $O_{2p}$ shifts a stopped down member $STM_1$ to bring the switch $so_1$ to contact with the wire connection $W_2$ with pin-taper-engagement of an isolator $STM_2$ and a taper portion $So_{1T}$ of the switch $So_1$. The above manual operation is for previewing the shutter speed. By releasing the manual operation the system is reset. While when the control lever $O_3$ is set at the indication l for light measure locking, the operable lever $O_1$ manually rotated remains at the rotated position and the system is ready for shutter control of through-the-stopped-down aperture sensing. The locking of the operable lever $O_1$ is released by return back from the position l to the position n of the control lever $O_3$. In case the control lever $O_3$ is set at m for manual mirror-up operation and when the operable lever $O_1$ is rotated in a clockwise direction, the reflex mirror $M_3$ is brought to a mirror-up position and remains there until the control lever $O_3$ at m is brought back to the position n. This mirror-up operation is convenient for the provision of a certain lens with its short back focus length. The above operational descriptions are clearly understood by the illustrative drawings particularly shown in FIGS. 16 and 17.

Figure 16:
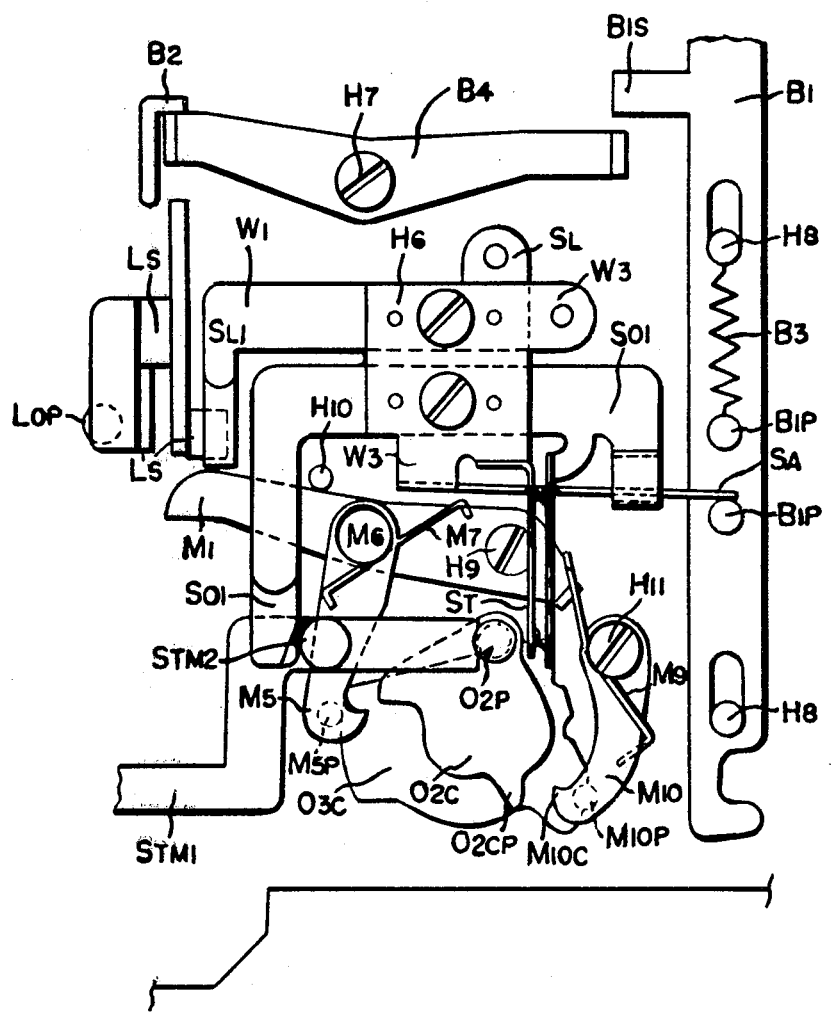

FIG. 16 shows the system with the control lever $O_3$ at n and the operable lever $O_1$ free from its operation. While FIG. 17 shows the system with the control lever $O_3$ at m and the operable lever $O_1$ in the process of its operation.

Figure 17:
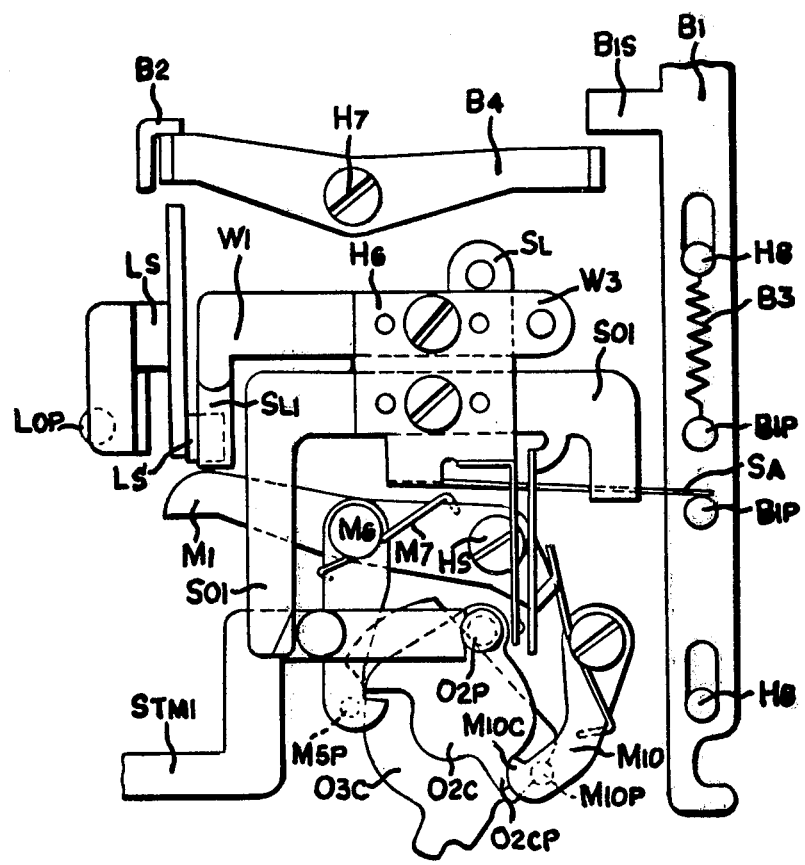

Referring to FIG. 17, further operation of the operable lever $O_1$ shifts the stopped-down member $STM_2$ as described before, and a mirror-up actuator $M_1$ is actuated with the aid of the interlocking of a lock pawl $M_5$ supported swingably around a pin $M_6$ on the member $M_1$ and biased by a spring $M_7$ between the pawl $M_5$ and the member $M_1$. As the member $M_1$ is supported rotatably around a pin $H_9$ on the camera body H and is biased in a clockwise direction by a spring $M_9$, the cam $O_{2c}$ the lock pawl $M_5$, the member $M_1$ and the control cam $O_{3c}$ rotate integrally in a counter-clockwise direction for the manual mirror-up operation until a hook member $M_{10}$ interlocks the operation cam $O_{2c}$. The interlocking of a hook $M_{10c}$ of the hook member $M_{10}$ and a projection $O_{2cp}$ of the operation cam $O_{2c}$ is released so as to be stopped by a stopper $H_{10}$ on the camera body H and return back to the state shown in FIG. 16 by the counter-clockwise rotation of the controller cam $O_{3c}$ with the aid of pin-notch-engagement of a pin $M_{10p}$ on the hook member $M_{10}$ and a notch portion of the cam $O_{3c}$. The spring $M_9$ is commonly used for the hook member $M_{10}$ as well as the member $M_1$. $H_{11}$ is a pin fixed to the camera body for supporting the hook member $M_{10}$ and the spring $M_9$. $M_{5p}$ is a pin planted on the lock member $M_5$. This pin $M_{5p}$ is also rotated by the cam $O_{3c}$ to disengage the interconnection between the lock member $M_5$ and the cam $O_{2c}$.

As shown in FIGS. 16 and 17, dimensions of parts are selected so as to permit the counter-clockwise rotation of the cam $O_{2c}$ until the hook $M_{10c}$ engages with the projection $O_{2cp}$, but the lock pawl $M_5$ does not engage with the cam $O_{2p}$ in case of the control cam $O_{3c}$ set at l, the manual operation of the operable lever $O_1$ locks the stopped-down member $M_2$ at its position for connecting the switch $SO_1$ to the lead connection $W_2$ for through-the-stopped-down aperture sensing. The rotation in a counter-clockwise direction of the cam $O_{3c}$ releases the interlocking of the hook member $M_{10}$ and the cam $O_{3c}$.

What is claimed is:

1. An electronic exposure detector comprising a logarithmic compression circuit having a plurality of linear semiconductive active elements, each output element having an output terminal, said compression circuit including an input stage having one of said elements and an output stage having one of said elements, said active element in said input stage having an input terminal and said active element in said output stage having the output terminal, a feedback circuit which is a direct conductive connection having no logarithmic means disposed between the output terminal of the active element in the output stage and the input terminal of the active element in the input stage, a photoelectric transducer connected to the output terminal of one of the active elements; and control circuit means connected to the output terminal of the compression circuit for controlling the exposure based on the output from the compression circuit.

2. An electronic exposure detector as in claim 1, wherein said compression circuit includes variable means connected to one of the stages for producing $\gamma$ compensation which comprises adjusting the output of the output stage.

3. An electronic exposure detector for responding to external photographic information comprising: a first logarithmic compression circuit having a plurality of linear semiconductive active elements, each active element having an output terminal, said compression circuit including an input stage having one of said active elements, and an output stage having one of said active elements, said active element in said input stage having an input terminal and said active element in said output stage having the output terminal, a feedback circuit which is a direct conductive connection having no logarithmic means disposed between the output terminal of the active element of said output stage and the input terminal of said active element in said input stage, a photoelectric transducer connected to the active element of at least one of the stages, a second logarithmic compression circuit having a plurality of linear semiconductive active elements, said second compression circuit including an input stage having one of said active elements, and an output stage having one of said active elements, said active element of said input stage having an input terminal, said active element of said output stage having an output terminal, a negative feedback circuit which is a direct conductive connection having no logarithmic means disposed between the output terminal of the active element of the output stage and the input terminal of the active element in the input stage, a plurality of variable means which set photographic information in said second logarithmic compression circuit, each of said variable means being connected to one of said active elements as predetermined, said first compression means producing the compressed output of the photoelectric transducer, said second compression means producing a compressed value of the variable means; a comparator responsive to said first and second compression circuits for comparing the logarithmically compressed values of the output of the variable means and the compressed output of the photoelectric transducer; and an indicating device connected to the comparator for indicating the output of the comparator.

4. An electronic exposure detector as in claim 3, wherein each of the first and second compression circuits comprises variable means connected to one of the stages for producing $\gamma$ compensation which comprises adjusting the output of the output stage.

5. An electronic exposure control device, comprising: an exposure control mechanism; a logarithmic compression circuit having a plurality of linear semiconductive active elements, each active element having an output terminal, said compression circuit including an input stage having one of the active elements, said element of said input stage having an input terminal, an output stage having one of said active elements, said active element of said output stage having an output terminal, a feedback circuit connected between the output terminal of the active element in the output stage and the input terminal of the active element in the input stage, a photoelectric transducer connected to the output terminal of one of the active elements; reproducing means for reproducing the logarithmically compressed output of the photoelectric transducer from the compression circuit, and control means for controlling said exposure control mechanism in response to the output of the photoelectric transducer which is reproduced by the reproducing means, and wherein said feedback circuit is a direct conductive connection having no logarithmic means disposed between the output terminal of the active element in the output stage and input terminal of the active element in the input stage.

6. An electronic exposure control device as in claim 5, wherein the compression circuit has variable means connected to one of the stages for producing $\gamma$ compensation which comprises adjusting the output of the output stage.

7. An electronic exposure control device for an exposure control mechanism and for responding to external photographic information comprising: a first logarithmic compression circuit having a plurality of linear semiconductive active elements, each active element having an output terminal, said compression circuit including an input stage having one of said active elements and an output stage also having one of said active elements, the active element in said input stage having an input terminal and the active element in said output stage having an output terminal, a negative feedback circuit which is a direct conductive connection having no logarithmic means disposed between the output terminal of the active element in the output stage and the input terminal of the active element in the input stage, a photoelectric transducer connected to the output terminal of at least one of the active elements; a second logarithmic compression circuit having a plurality of linear semiconductive active elements, said second compression circuit including an input stage having one of said active elements and an output stage having one of said active elements, said active element in said input stage having an input terminal and said active element in said output stage having an output terminal; a negative feedback circuit which is a direct conductive connection having no logarithmic means disposed between the output terminal of the active element in the output stage and the input terminal of the active element in the input stage, a plurality of variable means each of which having a value corresponding to photographic information and each variable means being connected to one of the active elements of the second compression circuit; said first compression circuit logarithmically compressing the output of said photoelectric transducer and said second compression circuit producing an output which corresponds to an individually and logarithmically compressed value of each of said variable means in response to each variable means; a comparator for comparing the logarithmically compressed output of the photoelectric transducer and the variable means and for synthesizing the outputs, and reproducing means for reproducing the output of the photoelectric transducer and the variable means which is synthesized by the comparator; and control means for controlling the exposure control mechanism in response to the output reproduced by the reproducing means.

8. An electronic exposure control device as in claim 7, wherein each of the first and second compression circuits includes means connected to one of the stages for compensating for $\gamma$ which comprises adjusting the output of the output stage.

9. An electronic exposure control device for controlling an exposure mechanism, comprising a logarithmic compression circuit having a plurality of linear semiconductive active elements; said compression circuit including an input stage having one of said active elements, said active element of said input stage having an input terminal, said active element of said output stage having an output terminal, a negative feedback connected between the output terminal of the active element in the output stage and the input terminal of the active element in the input stage, a photoelectric transducer connected to at least one of the active elements in one of said input and output stages; said compression circuit producing the logarithmically compressed output of the photoelectric transducer, memory means, coupling means for coupling said compression circuit to said memory means so that said memory means memorizes the compressed output of said photoelectric transducer, reproducing means responsive to said memory means for reproducing the output of said memory means, and control means responsive to said reproducing means for controlling the exposure control mechanism so that the exposure control mechanism effectively responds to the output of the photoelectric transducer.

10. An electronic exposure control device as in claim 9, wherein said compression circuit includes variable means connected to one of the stages for producing compensation for $\gamma$ which comprises adjusting the output of the output stage.

11. An electronic exposure control device as in claim 9 wherein said memory means includes switching means for alternately connecting said memory means to said coupling means and to said reproducing means, said memory means storing information when connected to said coupling means and reading out information when coupled to said reproducing means.

12. An electronic exposure control device as in claim 9, wherein said memory means includes a memory capacitor.

13. An electronic exposure control device as in claim 9, wherein said reproducing means includes high input resistance means for maintaining the content of said memory means in said memory means during readout.

14. A device as in claim 13 wherein said high input resistance means includes a Darlington circuit.

15. An electronic exposure control device as in claim 9, wherein said reproducing means includes a temperature compensating bias circuit.

16. An electronic exposure control device as in claim 9, wherein said control means includes a timer circuit having a timing capacitor and means for charging the timing capacitor with a constant current corresponding to the output of the reproducing circuit, whereby the timing capacitor is charged with a current corresponding to the photoelectric transducer.

17. A detector as in claim 9, wherein said compression circuit includes an intermediate stage connected in cascade between the input stage and the output stage.

18. A detector as in claim 9, wherein said compression circuit includes a loading resistance connected to the output terminal of the active element in the input stage.

19. A detector as in claim 9, wherein said active elements are transistors of the same conductive type connected in emitter-follower connection.

20. An electronic exposure control device for controlling an exposure control mechanism in response to external photographic information; comprising a first logarithmic compression circuit having a plurality of first linear semiconductive active elements; said first compression circuit including a first input stage having one of said first active elements, a first output stage having one of said active elements, said first input stage having an input terminal, said first output stage having an output terminal, a negative feedback circuit connected between the output terminal of the output stage and the input terminal of the input stage, and a photoelectric transducer connected to at least one of said first active elements in one of said input stage and said output stage; a second logarithmic compression circuit having a plurality of second linear semiconductive active elements; said second compression circuit including a second input stage having one of said second active elements, a second output stage having one of said second active elements, said second input stage having a second input terminal, said second output stage having a second output terminal, a second negative feedback connected between the second output terminal of the second output stage and the second input terminal of the second input stage, and variable means connected to at least one of said second elements in one of said second input stage and second output stage for setting values corresponding to the external photographic information; a comparator coupled to said first and second compression circuits for comparing the outputs of said first and second compression circuits and for synthesizing the logarithmically compressed output of the photoelectric transducer and the variable means; memory means coupled to said comparator for memorizing the compressed and synthesized output of the photoelectric transistor and the variable means; reproduction means for reproducing the compressed and synthesized and memorized output of the photoelectric transducer in the variable means; and control means for controlling the exposure control mechanism in response to the output of said reproduction means so as to respond to the photoelectric transducer and the variable means.

21. An electronic exposure control device as in claim 20, wherein each of said first and second compression circuits includes compensating means for compensating for $\gamma$.

22. An electronic exposure control device as in claim 21, wherein said memory means includes switching means for coupling said memory means to said comparator during a memory read-in and for coupling said memory means to said reproduction means during read-out.

23. An electronic exposure control means as in claim 22, wherein said switching means includes latch means.

24. An electronic exposure control device as in claim 23, wherein said latch means includes a diode in said memory means.

25. An electronic exposure control device as in claim 20, wherein said memory means includes a memory capacitor.

26. An electronic exposure control device as in claim 20, wherein said memory means includes high resistance input means for maintaining the content of said memory means during read-outs.

27. An electronic exposure control device as in claim 26, wherein said high resistance input means includes a Darlington circuit.

28. An electronic exposure control device as in claim 20, wherein said control means includes a timer circuit having a timer capacitor and constant current charging means for charging said capacitor with a current corresponding to the output of said reproduction means.

29. An electronic exposure control device as in claim 20, wherein said reproduction means includes temperature compensating means for biasing said reproduction means.

30. A camera as in claim 20, wherein said memory means includes a capacitor and switch means alternately connecting said capacitor to said comparator and said reproduction means for alternately reading-in and reading-out information in said capacitor.

31. A device as in claim 20, wherein said compression circuits include intermediate stages between said input stages and said output stages, said intermediate stages having active elements, said active elements in each compression circuit being emitter-follower connected transistors in cascade.

32. A device as in claim 28, wherein said reproduction means includes temperature compensating means for biasing the reproduction means, said reproduction means including the same number of active elements as in the first compression circuit, said active elements including transistors connected in series with each other, said reproduction means being connected to said memory means.

33. A device as in claim 28, wherein said reproduction means includes a reproduction circuit, said reproduction circuit including a plurality of transistors equal in number to the active elements in said first compression circuit, said transistors being cascaded with each other, said reproduction circuit having an input terminal connected to said memory device.

34. A device as in claim 28 wherein the number of active elements in said compression circuits are equal to each other, and each of said active elements are transistors.

35. A device as in claim 9, wherein said feedback circuit is a direct conductive connection between the output terminal of the active element in the output stage and the input terminal of the active element in the input stage.

36. A single lens reflex camera, comprising a shutter release button, an objective lens, a mirror for passing light from said objective lens to an operator, a mirror control mechanism for raising the mirror in response to said shutter release button, a shutter for establishing an exposure time, a shutter control mechanism for closing and opening the shutter after the mirror has been raised, a first logarithmic compression circuit having a plurality of first linear semiconductive active elements; said first compression circuit including a first input stage having one of said first active elements, a first output stage having one of said active elements, said first input stage having an input terminal, said first output stage having an output terminal, a negative feedback circuit connected between the output terminal of the output stage and the input terminal of the input stage, and a photoelectric transducer connected to at least one of said first active elements in one of said input stage and said output stage; a second logarithmic compression circuit having a plurality of second linear semiconductive active elements; said second compression circuit including a second input stage having one of said second active elements, a second output stage having one of said second active elements, said second input stage having a second input terminal, said second output stage having a second output terminal, a second negative feedback connected between the second output terminal of the second output stage and the second input terminal of the second input stage, and variable means connected to at least one of said second elements in one of said second input stage and second output stage for setting values corresponding to the external photographic information; a comparator coupled to said first and second compression circuit for comparing the outputs of said first and second compression circuits and for synthesizing the logarithmically compressed output of the photoelectric transducer and the variable means; memory means coupled to said comparator for memorizing the compressed and synthesized output of the photoelectric transistor and the variable means; reproduction means for reproducing the compressed and synthesized and memorized output of the photoelectric transducer in the variable means; the control means for controlling the exposure control mechanism in response to the output of said reproduction means so as to respond to the photoelectric transducer and the variable means.

37. In an electronic exposure detector, comprising: a photoelectric transducer, a plurality of amplifying stages having respective inputs and outputs connected to cascade so as to define first and last stages, said amplifying stage including an active element, a feedback circuit which is a direct conductive connection having no logarithmic means disposed between the output terminal of the last stage and the input terminal of the first stage, each of said stages having a substantially linear input-output characteristic, said feedback circuit having a substantially linear input-output characteristic, said photoelectric transducer being connected into one of said stages for applying a signal corresponding to a light level at the stage to which the transducer is connected; said negative feedback circuit imposing upon the output of the last stage a characteristic, relative to the signal at the photoelectric transducer, which changes the signal logarithmically and which substantially differs from the characteristic of any of the stages and that of the feedback circuit.

38. An electronic exposure detector for responding to external photographic information, comprising: a first logarithmic compression circuit having a plurality of linear semiconductive active elements, each active element having an output terminal, said compression circuit including an input stage having one of said active elements and an output stage having also one of said active elements, the active element in said input stage having an input terminal and the active element in said output stage having the output terminal; a feedback circuit which is a direct conductive connection between the output terminal of the active element of said output stage and the input terminal of the active element in said input stage; a photoelectric transducer connected to the active element of at least one of the stages; a second logarithmic compression circuit having a plurality of linear semiconductive active elements, said second compression circuit including an input stage having one of said active elements and an output stage also having one of said active elements, the active element of said input stage having an input terminal and the active element of said output stage having an output terminal; a negative feedback circuit which is a direct conductive connection between the output terminal of the active element in the output stage and the input terminal of the active element in the input stage; a plurality of variable means which set photographic information in said second logarithmic compression circuit, each of said variable means being connected to one of the active elements as predetermined, a variable resistor connected to the output terminal of the active element in the output stage so as to form a loading resistance; said first compression circuit producing the compressed output of the photoelectric transducer and said second compression circuit producing a compressed value of the variable means; a comparator responsive to said first and second compression circuits for comparing the logarithmically compressed output values of the variable means and the compressed output of the photoelectric transducer; and an indicating device connected to the comparator for indicating the output of the comparator.

39. An electronic exposure detector for responding to external photographic information, comprising: a first logarithmic compression circuit having a plurality of linear semiconductive active elements, each active element having an output terminal, said compression circuit including an input stage having one of said active elements and an output stage having also one of said active elements, the active element in said input stage having an input terminal and the active element in said output stage having the output terminal; a feedback circuit which is a direct conductive connection having no logarithmic means disposed between the output terminal of the active element of said output stage and the input terminal of the active element in the input stage; a photoelectric transducer connected to the active element of at least one of the stages; a second logarithmic compression circuit having a plurality of linear semiconductive active elements, said second compression circuit including an input stage having one of said active elements and an output stage having one of said active elements, the active element of said input stage having an input terminal and the active element of said output stage having an output terminal; a negative feedback circuit which is a direct conductive connection between the output terminal of the active element in said output stage and the input terminal of the active element in said input stage; a plurality of variable means which set photographic information in said second logarithmic compression circuit, each of said variable means being connected to one of the active elements as predetermined; said first compression circuit producing a compressed output of the photoelectric transducer and said second compression circuit producing a compressed value of the variable means; a comparator responsive to said first and second compression circuits for comparing the logarithmically compressed output values of the variable means and the compressed output of the photoelectric transducer; and an indicating device connected to the comparator for indicating the output of the comparator and said compression circuits each including intermediate stages connected between said input stage and output stage and having an active element, said active elements each having a transistor of the same conductive type, said active elements being connected to each other in emitter-follower connection.

40. An electronic exposure control device, comprising: an exposure control mechanism; a logarithmic compression circuit having a plurality of linear semiconductive active elements, each active element having an output terminal, said compression circuit including an input stage having one of the active elements, said element of said input stage having an input terminal, an output stage having one of said active elements, said active element of said output stage having an output terminal, a feedback circuit formed by connecting the output terminal of the active element of the output stage directly to the input terminal of the active element of the input stage, a photoelectric transducer connected to an active element of at least one of the stages; reproducing means for reproducing logarithmically compressed output of the photoelectric transducer, and control means for controlling said exposure control mechanism in response to the output of the photoelectric transducer which is reproduced by the reproducing means, and wherein said feedback circuit is a direct conductive connection between the output terminal of the active element in the output stage and input terminal of the active element in the input stage and wherein said compression includes an intermediate stage connected between said input stages and said output stages and having an active element, said active elements each being a transistor of the same conductive type, said active elements being connected to each other in emitter-follower connection.

41. A device as in claim 40, wherein said reproduction circuit comprises a constant current circuit connected into the current path of one of said transistors.

42. An electronic exposure control device, comprising: an exposure control mechanism; a logarithmic compression circuit having a plurality of linear semiconductive active elements, each active element having an output terminal, said compression circuit including an input stage having one of the active elements, said element of said input stage having an input terminal, an output stage having one of said active elements, said active element of said output stage having an output terminal, a feedback circuit formed by connecting the output terminal of the active element of the output stage directly to the input terminal of the active element of the input stage, a photoelectric transducer connected to an active element of at least one of the stages; reproducing means for reproducing logarithmically compressed output of the photoelectric transducer, and control means for controlling said exposure control mechanism in response to the output of the photoelectric transducer which is reproduced by the reproducing means, and wherein said feedback circuit is a direct conductive connection between the output terminal of the active element in the output stage and input terminal of the active element in the input stage and wherein said control means includes a temperature compensating network having a plurality of portions equal in number to the active element in the compression circuit of said control means, said portions being connected in series with each other and having an output connected to said reproducing means.

43. An electronic exposure control device for an exposure control mechanism and for responding to external photographic information comprising: a first logarithmic compression circuit having a plurality of linear semiconductive active elements, said compression circuit including an input stage having one of said active elements, an output stage having one of said active elements, the active element in said input stage having an input terminal, the active element in said output stage having an output terminal, a feedback circuit which is a direct conductive connection having no logarithmic means disposed between the output terminal of the element in the output stage and the input terminal of the active element in the input stage, a photoelectric transducer connected to at least one of the active elements of said input stage and said output stage, a second logarithmic compression circuit having a plurality of second linear semiconductive active elements, said second compression circuit including a second input stage having one of said second active elements, a second stage having one of said second active elements, the one of said second active elements in said second input stage having a second input terminal, the one of said second active elements in said second output stage having a second output terminal; a negative feedback circuit which is a direct conductive connection having no logarithmic means disposed between the second output terminal of the second active element in the second output stage and the input terminal of the second active element in the second input stage, variable means connected to at least one of said second active elements for setting values corresponding to the photographic information; said first compression circuit logarithmically compressing the output of said photoelectric transducers, said second compression circuit logarithmically compressing the setting of the variable means; a comparator for comparing the logarithmically compressed output of the photoelectric transducer and the variable means and for synthesizing the outputs, and reproducing means for reproducing the output of the photoelectric transducer and the variable means which is synthesized by the comparator; and control means for controlling the exposure control mechanism in response to the output reproduced by the reproducing means and wherein said feedback circuit is a direct conductive connection between the output terminal of the active element in the output stage and the input terminal of the active element in the input stage.

44. A photographic camera having an automatic time control shutter system and a system for measuring light through the photographic taking lens; comprising a light measuring portion comprising a photosensitive element means including a logarithmic compression network having a plurality of linear semiconductive active elements, each of which has an input terminal and an output terminal, said network including an input stage having at least one of said active elements, and an output stage having at least one of said active elements, the elements of said input stage having an input terminal and said element of said output stage having an output terminal connected to each other, said light measuring portion being connected to the output terminal of said active element in one of said stages so as to provide an output which is logarithmic function of the light incident on said photosensitive element; a diaphragm value and film sensitivity value setting portion including a variable resistor for providing a second output which is a logarithmic function of said value; a memory capacitor, means for charging said memory capacitor to a voltage which is an arithmetic function of said logarithmic compression circuit and said setting block; a timing capacitor and means including a logarithmic expansion circuit and a constant-current charging network for charging said timing capacitor at a constant rate which is an antilog function of said voltage whereby said timing capacitor is constant current charged with a current which is proportional to the incident light amount in synchronism with the start of the camera shutter opening and means including a switching circuit responsive to the charge on said timing capacitor for controlling said shutter.

45. An electronic exposure detector as defined in claim 44, said active elements being transistors which are connected in cascade.

* * * * *